(12) United States Patent
Yang et al.

(10) Patent No.: US 9,674,886 B2
(45) Date of Patent: Jun. 6, 2017

(54) METHOD AND APPARATUS FOR TRANSMITTING SIGNALS TO A PLURALITY OF TRANSMISSION POINTS

(71) Applicant: LG ELECTRONICS INC., Seoul (KR)

(72) Inventors: Suckchel Yang, Seoul (KR); Yunjung Yi, Seoul (KR); Joonkui Ahn, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/651,188

(22) PCT Filed: Jan. 7, 2014

(86) PCT No.: PCT/KR2014/000142
§ 371 (c)(1),
(2) Date: Jun. 10, 2015

(87) PCT Pub. No.: WO2014/107088
PCT Pub. Date: Jul. 10, 2014

(65) Prior Publication Data
US 2015/0319718 A1    Nov. 5, 2015

Related U.S. Application Data

(60) Provisional application No. 61/749,400, filed on Jan. 7, 2013, provisional application No. 61/765,801, filed
(Continued)

(51) Int. Cl.
*H04W 72/04*  (2009.01)
*H04W 76/02*  (2009.01)
(Continued)

(52) U.S. Cl.
CPC ......... *H04W 76/025* (2013.01); *H04W 24/08* (2013.01); *H04W 28/18* (2013.01);
(Continued)

(58) Field of Classification Search
CPC . H04L 5/0053–5/0057; H04L 5/0091–5/0098; H04W 52/04–52/36; H04W 76/02–76/028
See application file for complete search history.

(56) References Cited

U.S. PATENT DOCUMENTS

2010/0260117 A1    10/2010  Ojala et al.
2011/0237283 A1    9/2011   Shan et al.
(Continued)

FOREIGN PATENT DOCUMENTS

KR    10-2012-0017051    2/2012
KR    10-2012-0090081    8/2012
(Continued)

OTHER PUBLICATIONS

PCT International Application No. PCT/KR2014/000142, Written Opinion of the International Searching Authority dated Apr. 25, 2014, 17 pages.
(Continued)

*Primary Examiner* — Marcus R Smith
(74) *Attorney, Agent, or Firm* — Lee Hong Degerman Kang Waimey

(57) ABSTRACT

The present invention relates to a method and an apparatus for transmitting uplink signals to a plurality of transmission points in a wireless communication system, comprising: receiving information on at least one parameter set group through upper layer signaling, wherein each of the at least one parameter set group includes a plurality of parameter sets; detecting a physical downlink control channel (PDCCH) comprising indication information for indicating specific parameter sets which belong to one of the parameter set
(Continued)

groups from among the at least one parameter set group; and transmitting a physical uplink shared channel (PUSCH) by using the specific parameter set, wherein each of the plurality of parameter sets includes information on a power control parameter and information on timing advance (TA) for transmitting the PUSCH signal.

20 Claims, 21 Drawing Sheets

Related U.S. Application Data on Feb. 17, 2013, provisional application No. 61/866,554, filed on Aug. 16, 2013, provisional application No. 61/872,857, filed on Sep. 3, 2013.

(51) Int. Cl.
| | |
|---|---|
| H04W 52/40 | (2009.01) |
| H04W 24/08 | (2009.01) |
| H04W 28/18 | (2009.01) |
| H04L 5/00 | (2006.01) |
| H04W 88/02 | (2009.01) |
| H04W 72/08 | (2009.01) |
| H04W 84/04 | (2009.01) |
| H04W 72/12 | (2009.01) |

(52) U.S. Cl.
CPC ....... *H04W 52/40* (2013.01); *H04W 72/0406* (2013.01); *H04L 5/0053* (2013.01); *H04L 5/0091* (2013.01); *H04W 72/08* (2013.01); *H04W 72/1289* (2013.01); *H04W 84/042* (2013.01); *H04W 88/02* (2013.01)

(56) References Cited

U.S. PATENT DOCUMENTS

| | | |
|---|---|---|
| 2011/0250918 A1 | 10/2011 | Jen |
| 2012/0176884 A1 | 7/2012 | Zhang et al. |
| 2014/0036738 A1 | 2/2014 | Kim et al. |
| 2014/0044097 A1* | 2/2014 | Chen .................... H04W 36/24 370/331 |
| 2014/0092829 A1 | 4/2014 | Han et al. |
| 2014/0133415 A1* | 5/2014 | Damnjanovic ..... H04W 76/048 370/329 |
| 2015/0257060 A1 | 9/2015 | Goto et al. |
| 2015/0341818 A1 | 11/2015 | Han et al. |
| 2015/0351039 A1 | 12/2015 | Yang et al. |
| 2015/0351119 A1* | 12/2015 | Song ................. H04W 72/1268 370/329 |

FOREIGN PATENT DOCUMENTS

| | | |
|---|---|---|
| KR | 10-2012-0139785 | 12/2012 |
| WO | 2008/042967 | 4/2008 |
| WO | 2011052978 | 5/2011 |
| WO | 2011/120716 | 10/2011 |
| WO | 2011126329 | 10/2011 |
| WO | 2013/002576 | 1/2013 |

OTHER PUBLICATIONS

PCT International Application No. PCT/KR2014/000142, Written Opinion of the International Searching Authority dated Apr. 25, 2014, 13 pages.
European Patent Office Application No. 14735111.8, Search Report dated Aug. 24, 2016, 10 pages.
Sharp, "DCI signalling in DCI format 2D and fallback operation in TM10", R1-125242, 3GPP TSG RAN WG1 Meeting #71, Nov. 2012, 9 pages.
ZTE, "Remaining details of downlink control signalling for DL CoMP", R1-125250, 3GPP TSG RAN WG1 Meeting #71, Nov. 2012, 7 pages.
PCT International Application No. PCT/KR2014/000152, Written Opinion of the International Searching Authority dated Apr. 29, 2014, 19 pages.
NTT DOCOMO, "Downlink Control Signaling for Rel. 11 CoMP," 3GPP TSG RAN WG1 Meeting #71, R1-125314, Nov. 2012, 7 pages.
U.S. Appl. No. 14/651,196, Office Action dated Oct. 31, 2016, 30 pages.
U.S. Appl. No. 14/651,188, Notice of Allowance dated Feb. 15, 2017, 10 pages.

* cited by examiner

FIG. 7
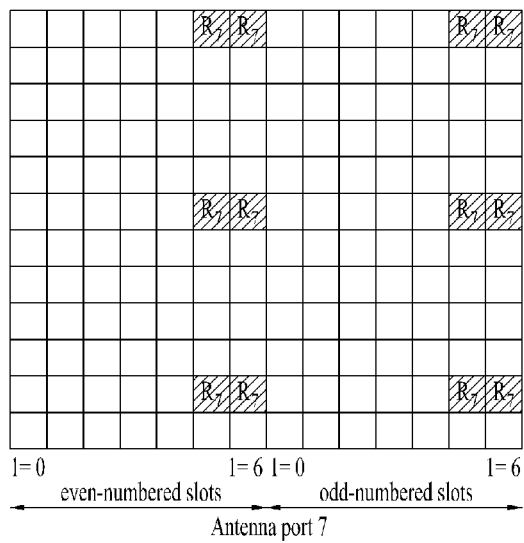
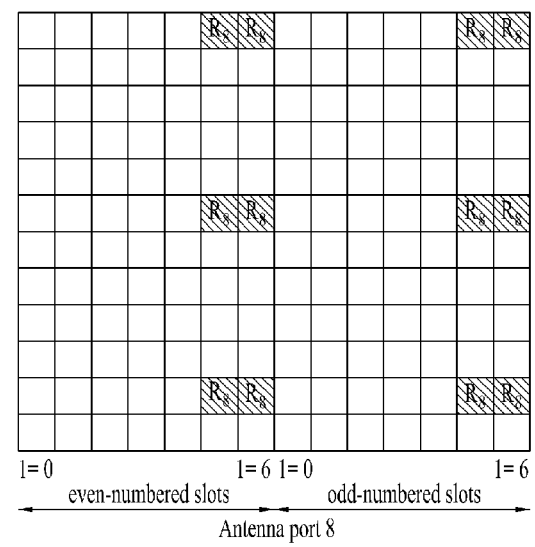
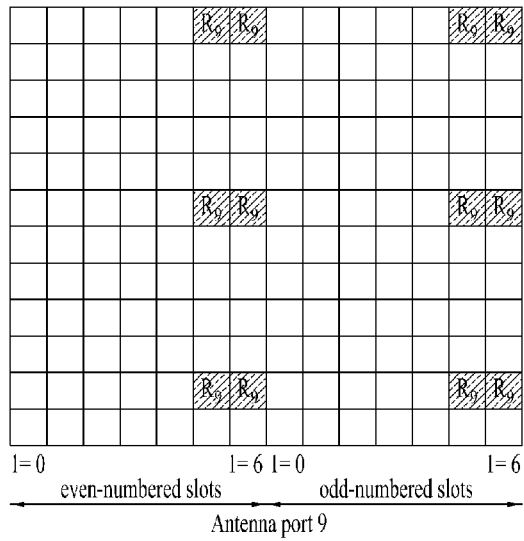
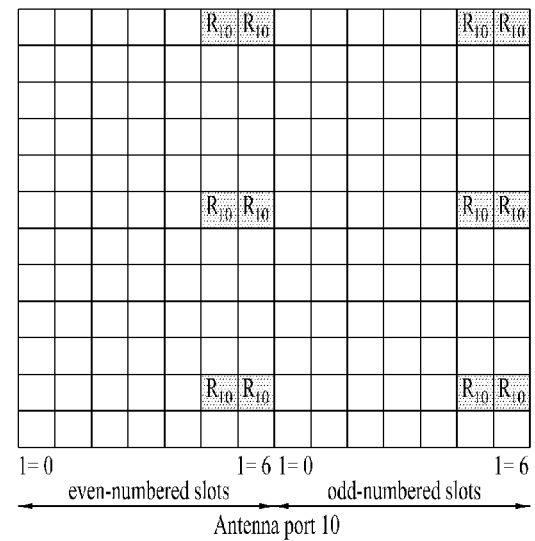

PUCCH format 1a and 1b structure (normal CP case)

PUCCH format 2,2a and 2b structure (normal CP case)

FIG. 20

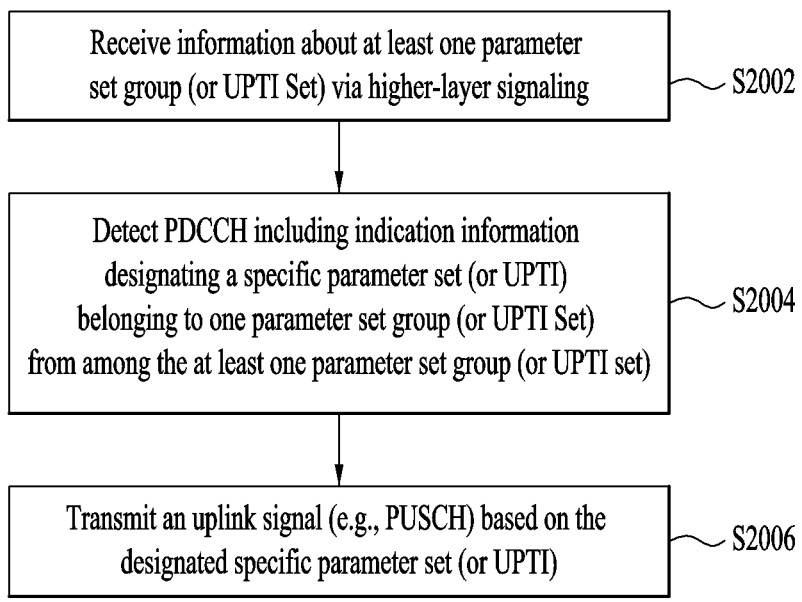

* Each parameter set (or UPTI) includes information about a power control parameter and TA (Timing Advance) for transmitting the uplink signal (e.g., PUSCH)

* If there exist a plurality of partial search spaces or a plurality of parameter set groups (or UPTI sets) are given, each parameter set group (or UPTI set) is configured independently per partial search space for PDCCH detection, and which parameter set group (or UPTI set) the designated specific parameter set (or UPTI) belongs to is determined according to a partial search space in which the PDCCH is detected.

METHOD AND APPARATUS FOR TRANSMITTING SIGNALS TO A PLURALITY OF TRANSMISSION POINTS

CROSS-REFERENCE TO RELATED APPLICATIONS

This application is the National Stage filing under 35 U.S.C. 371 of International Application No. PCT/KR2014/000142, filed on Jan. 7, 2014, which claims the benefit of U.S. Provisional Application Nos. 61/749,400, filed on Jan. 7, 2013, 61/765,801, filed on Feb. 17, 2013, 61/866,554, filed on Aug. 16, 2013 and 61/872,857, filed on Sep. 3, 2013, the contents of which are all hereby incorporated by reference herein in their entirety.

TECHNICAL FIELD

The present invention relates to a wireless communication system, and more particularly, to a method and apparatus for efficiently transmitting or receiving a signal using a plurality of nodes.

BACKGROUND ART

Wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and apparatus for efficiently transmitting or receiving a signal in a wireless communication system.

Another object of the present invention is to provide a method and apparatus for efficiently transmitting or receiving a signal through a plurality of nodes or transmission points in a wireless communication system.

Another object of the present invention is to provide a method and apparatus for efficiently transmitting or receiving a signal through a plurality of nodes or transmission points managed/operated by different Base Stations (BSs) in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, provided herein is a method for transmitting an uplink signal to a plurality of transmission points by a User Equipment (UE) in a wireless communication system, the method comprising: receiving information about at least one parameter set group via higher-layer signaling, each of the at least one parameter set group including a plurality of parameter sets; detecting a Physical Downlink Control Channel (PDCCH) including indication information indicating a specific parameter set belonging to one parameter set group of the at least one parameter set group; and transmitting a Physical Uplink Shared Channel (PUSCH) signal using the specific parameter set, wherein each of the plurality of parameter sets includes information about Timing Advance (TA) and information about power control parameter for transmission of the PUSCH signal.

In another aspect of the present invention, provided herein is a User Equipment (UE) for transmitting an uplink signal to a plurality of transmission points in a wireless communication system, the UE comprising: a Radio Frequency (RF) unit; and a processor, wherein the processor is configured to receive information about at least one parameter set group via higher-layer signaling through the RF unit, each of the at least one parameter set group including a plurality of parameter sets, detect a Physical Downlink Control Channel (PDCCH) including indication information indicating a specific parameter set in one parameter set group of the at least one parameter set group, and transmit a Physical Uplink Shared Channel (PUSCH) signal using the specific parameter set, and wherein each of the plurality of parameter sets includes information about Timing Advance (TA) and information about power control parameter for transmission of the PUSCH signal.

Preferably, the information about power control parameter may include open-loop power control parameter information for transmission of the PUSCH signal or mapping information between a Transmit Power Control (TPC) command included in the PDCCH and a value indicated by the TPC command, and each of the plurality of parameter sets may include at least one of information about a cell Identity (ID) for generating UE-specific Demodulation Reference Signal (DMRS) for transmission of the PUSCH signal, information about a Sounding Reference Signal (SRS) transmission subframe, and information about an SRS transmission band.

Preferably, the PDCCH may include a TPC command, and a value indicated by the TPC command may be accumulated only for a same parameter set.

Preferably, if the PDCCH includes downlink control information common to a plurality of UEs and the downlink control information includes a TPC command, a value indicated by the TPC command may be accumulated for all parameter sets.

Preferably, if the PDCCH includes downlink control information common to a plurality of UEs and the downlink control information includes a TPC command, a value indicated by the TPC command may be accumulated for a predetermined parameter set, and the predetermined parameter set may be a parameter set having a lowest index, a parameter set having a highest index, or a parameter set determined by higher-layer signaling.

Preferably, each of the at least one parameter set group may be configured independently per search space for detection of the PDCCH, and a parameter set group to which the specific parameter set belongs from among the plurality of parameter set groups may be determined according to a search space in which the PDCCH is detected.

Preferably, a search space for detection of the PDCCH may include a PDCCH candidate group, and a parameter set group to which the specific parameter set belongs from among the plurality of parameter set groups may be determined according to a PDCCH candidate group in which the PDCCH is detected.

Preferably, a search space for detection of the PDCCH may include a specific subframe group, and a parameter set group to which the specific parameter set belongs from among the plurality of parameter set groups may be determined according to a subframe in which the PDCCH is detected.

Preferably, a search space for detection of the PDCCH may be a UE-specific search space or a cell-specific search space, and a parameter set group to which the specific parameter set belongs from among the plurality of parameter set groups may be determined according to whether the PDCCH is detected in the UE-specific search space or the cell-specific search space.

Preferably, each of the plurality of parameter sets may further include information for reception of a Physical Hybrid automatic repeat and request indicator Channel (PHICH) signal corresponding to transmission of the PUSCH signal, and the information for reception of the PHICH signal may include at least one of information about the number of Cell-specific Reference Signal (CRS) antenna ports, information about a CRS frequency shift, PHICH configuration information, and PHICH resource index information.

Preferably, if a plurality of PDCCHs are detected in a plurality of search spaces and the plurality of search spaces are overlapped at least partially, a parameter set indicated by indication information included in a PDCCH detected in a search space indicated by higher-layer signaling may be used.

Preferably, if a plurality of PDCCHs are detected in a plurality of search spaces and the plurality of search spaces are overlapped at least partially, a parameter set indicated by indication information included in a PDCCH detected in a preset search space may be used, and the preset search space may have a lowest index or a highest index.

Preferably, if a plurality of PDCCHs are detected in a plurality of search spaces and the plurality of search spaces are overlapped at least partially, detection of a PDCCH candidate may be skipped in the overlapped search space.

Advantageous Effects

According to the present invention, a signal can be transmitted or received efficiently in a wireless communication system.

According to the present invention, a signal can be transmitted or received efficiently through a plurality of nodes or transmission points in a wireless communication system.

According to the present invention, a signal can be transmitted or received efficiently through a plurality of nodes or transmission points managed/operated by different base stations in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 7 illustrates mapping patterns of demodulation reference signal (DMRS) according to antenna ports.

FIG. 20 is an exemplary flowchart illustrating a UL signal transmission method according to the present invention.

BEST MODE FOR CARRYING OUT THE INVENTION

Figure 1:
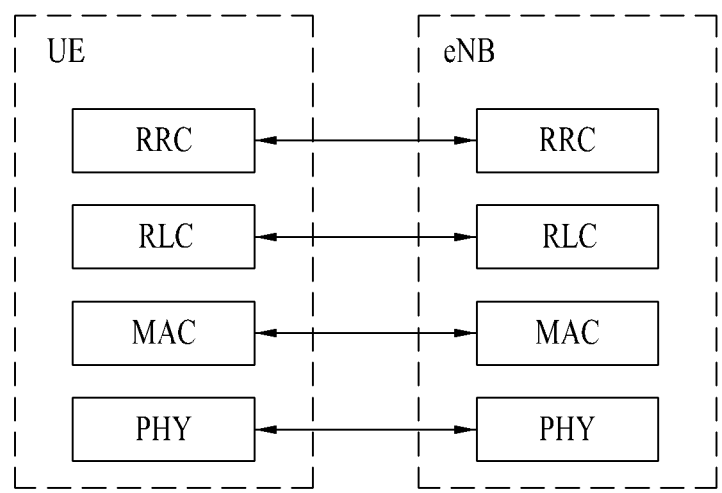
FIG. 1 illustrates layers of a radio protocol.

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3$^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a UE may receive information from a BS in downlink (DL) and transmit information in uplink (UL). The information transmitted or received by the UE may include data and various control information. In addition, there are various physical channels according to the type or use of the information transmitted or received by the UE.

In the present invention, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, a BS may be interchangeably referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. Alternatively, a node may not be an eNB. For example, a node may be a radio remote head (RRH) or a radio remote unit (RRU). The RRH or RRU generally has a lower power level than a power level of an eNB. Since the RRH or RRU (hereinafter, refer to as an RRH) is generally connected to the eNB through a dedicated line such as an optical cable, cooperative communication between RRH/RRU and the eNB can be smoothly performed in comparison with cooperative communication between eNBs connected by a radio line.

At least one antenna is installed per node. The antenna may mean a physical antenna or mean an antenna port, a virtual antenna, or an antenna group. A node may be referred to as a transmission point (TP). As compared to the conventional centralized antenna system (CAS) (i.e. single node system) in which antennas are centralized to a base station and controlled by one eNB controller, in the multi-node system, a plurality of nodes are typically located with a certain spacing with each other. The plurality of nodes may control operations of each node, or may be managed by one or more eNBs or eNB controllers which schedule data transmitted/received by each node. Each node may be connected to an eNB or eNB controller managing a corresponding node through a cable or dedicated line. In the multi-node system, the same cell identity (ID) or different cell IDs may be used to transmit/receive signals to/from a plurality of nodes. If the plurality of nodes have the same cell ID, each of the nodes operates as a partial antenna group of one cell. If the plurality of nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH and the eNB use different cell IDs, both the RRH and the eNB may operate as independent eNBs.

In a multi-node system, one or more eNBs or eNB controllers connected to plural nodes can control the plural nodes such that signals are simultaneously transmitted to or received from a UE through some or all nodes of the plural nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is referred to as multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be referred to as DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a "cell" refers to a geographical area in which one or more nodes provide a communication service. Accordingly, in the present invention, communicating with a specific cell may mean communicating with an eNB or a node which provides a communication service to the specific cell. In addition, a downlink (DL)/uplink (UL) signal of a specific cell refers to a downlink/uplink signal from/to an eNB or a node which provides a communication service to the specific cell. A cell providing UL/DL communication services to UE is referred to as a serving cell.

FIG. 1 illustrates layers of a radio protocol.

The physical layer (PHY) which is a first layer provides information transfer services to the upper layers using a physical channel. The PHY layer is connected to the upper medium access control (MAC) layer through a transport channel, and data between the MAC layer and the PHY layer is transferred through the transport channel. In this case, the transport channel is roughly divided into a dedicated transport channel and a common transport channel based on whether or not the channel is shared. Furthermore, data is transferred between different PHY layers, i.e., between PHY layers at transmitter and receiver sides.

A second layer may include various layers. The medium access control (MAC) layer serves to map various logical channels to various transport channels, and also performs logical channel multiplexing for mapping several logical channels to one transport channel. The MAC layer is connected to a radio link control (RLC) layer, which is an upper layer, through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A radio resource control (RRC) layer located at the uppermost portion of a third layer is only defined in the control plane. The RRC layer performs a role of controlling logical channels, transport channels, and physical channels in relation to configuration, re-configuration, and release of radio bearers. Here, the radio bearer denotes a logical path provided by the first and the second layers for transferring data between the UE and the UTRAN. In general, the configuration of the radio bearer refers to a process of stipulating the characteristics of protocol layers and channels required for providing a specific service, and setting each of the detailed parameter and operation methods thereof. The radio bearer is divided into a signaling radio bearer (SRB) and a data radio bearer (DRB), wherein the SRB is used as a path for transmitting RRC messages in the control plane while the DRB is used as a path for transmitting user data in the user plane.

In a wireless access system, a user equipment (UE) may receive information from a base station (BS) in downlink (DL) and transmit information in uplink (UL). The information transmitted or received by the UE may include general data information and various control information. In addition, there are various physical channels according to the type or use of the information transmitted or received by the UE.

Figure 2:
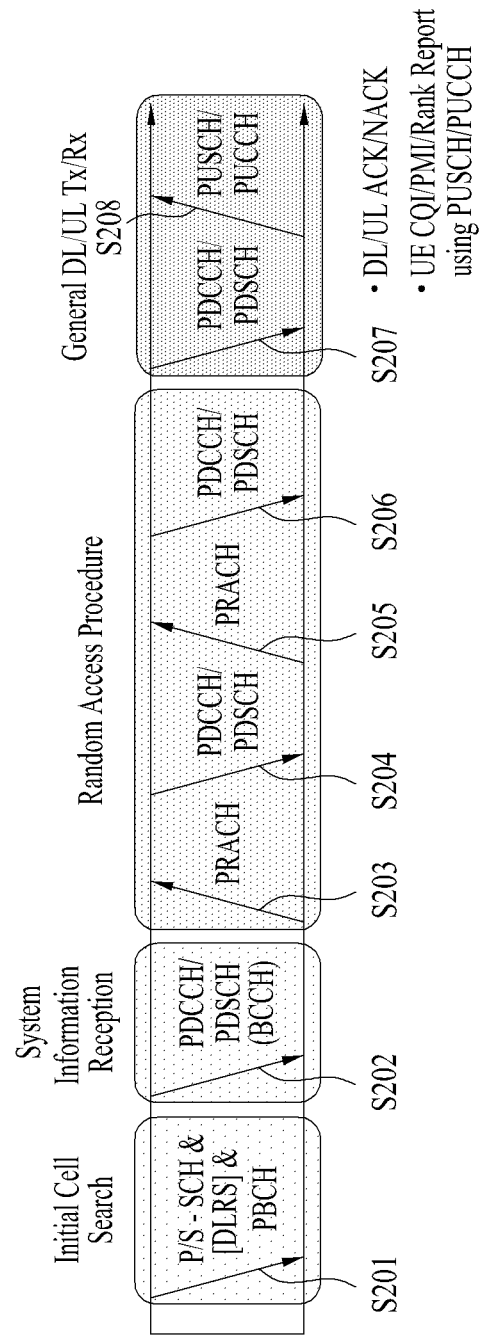
FIG. 2 illustrates physical channels and a general method for transmitting signals on the physical channels in the LTE(-A) system.

FIG. 2 illustrates physical channels and a general method for transmitting signals on the physical channels in the LTE(-A) system.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization channel (P-SCH) and a secondary synchronization channel (S-SCH) from the base station. Then the UE may acquire broadcast information in the cell by receiving a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is referred to as Uplink Control Information (UCI). The UCI includes hybrid automatic repeat and request acknowledgement/ negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 3:
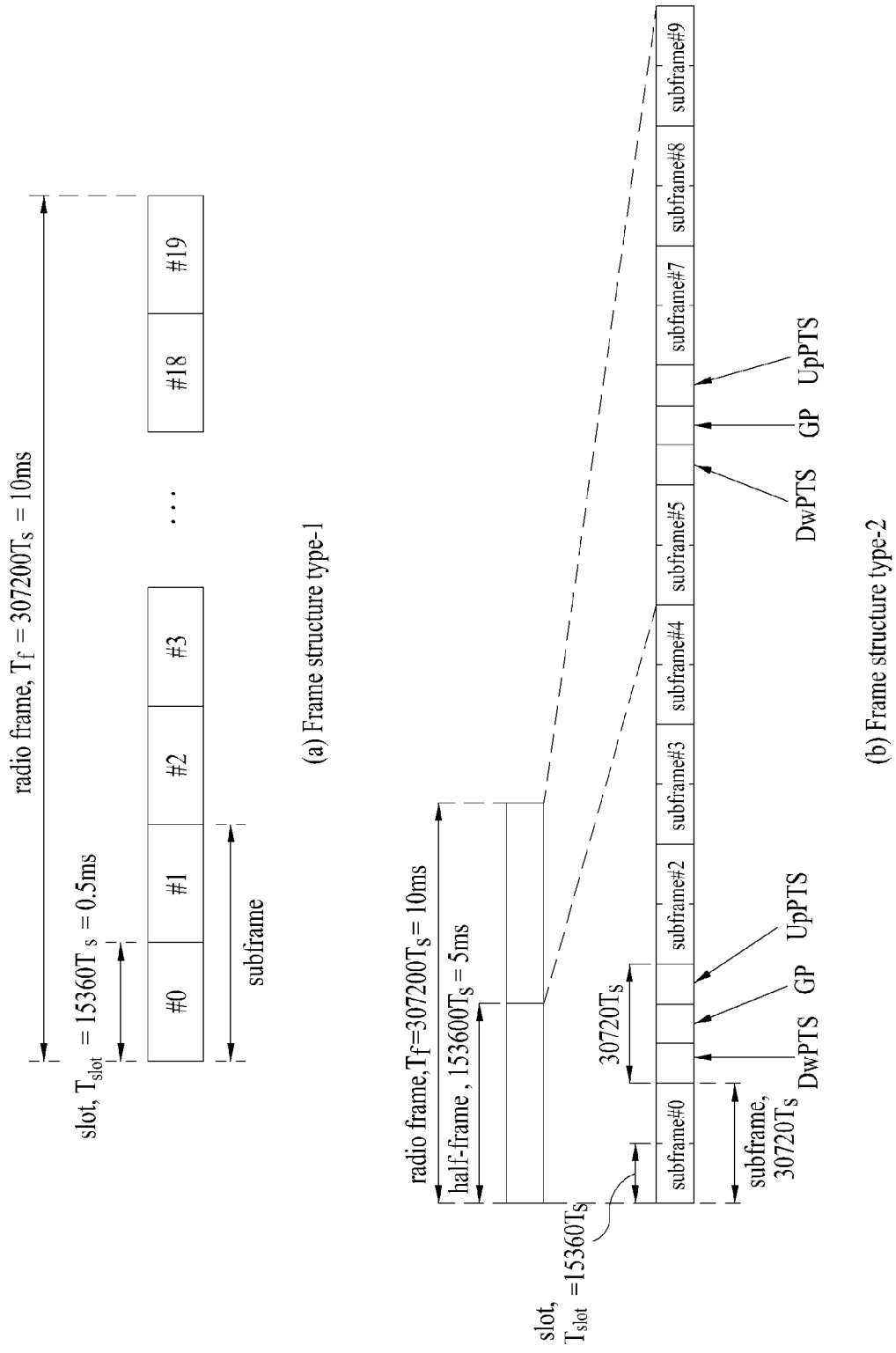
FIG. 3 illustrates a structure of a radio frame used in the LTE(-A) system.

FIG. 3 illustrates a structure of a radio frame used in the LTE(-A) system. In a cellular OFDM radio packet communication system, uplink/downlink data packet transmission is performed in the unit of a subframe (SF), and one subframe is defined as a predetermined duration including a plurality of OFDM symbols. The LTE(-A) system supports a type-1 radio frame structure applicable to frequency division duplex (FDD) and a type-2 radio frame structure applicable to time division duplex (TDD).

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol duration. In the LTE(-A) system, since SC-FDMA is used in uplink, an OFDM symbol may be referred to as an SC-FDMA symbol in the present specification, and also may be collectively referred to as a symbol duration. A resource block (RB) as a resource assignment unit may include a plurality of consecutive subcarriers in one slot.

The length of one symbol duration (or the number of OFDM symbols included in one slot) may vary according to a configuration of cyclic prefix (CP). The cyclic prefix refers to repeating a portion of symbol (e.g. the last portion of symbol) or the entire symbol and placing the repeated portion in front of the symbol. The cyclic prefix is used to remove inter-symbol interferences or facilitate a channel measurement of frequency-selective multi-path channel. The cyclic prefix includes an extended CP and a normal CP. For example, if OFDM symbols are configured by the normal CP, the number of OFDM symbols included in one slot may be 7. In case of the extended CP, for example, the number of OFDM symbols included in one slot may be 6.

FIG. 3(b) illustrates a structure of the type-2 radio frame. The type-2 radio frame includes two half frames, and each half frame includes five subframes, a downlink period (e.g. a downlink pilot time slot or DwPTS), a guard period (GP) and an uplink period (e.g. an uplink pilot time slot or UpPTS). One subframe includes two slots. For example, The downlink period (e.g., DwPTS) is used for initial cell search, synchronization or channel estimation of a UE. For example, the uplink period (e.g., UpPTS) is used for channel estimation of a BS and uplink transmission synchronization of a UE. For example, the uplink period (e.g., UpPTS) may be used to transmit a sounding reference signal (SRS) for channel estimation in a base station and to transmit a physical random access channel (PRACH) that carriers a random access preamble for uplink transmission synchronization. The guard period is used to eliminate interference generated in uplink due to multi-path delay of a downlink signal between uplink and downlink. Table 1 shows an example of an uplink-downlink (UL-DL) configuration of subframes within a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), U represents an uplink subframe (UL SF), and S represents a special subframe. The special subframe includes a downlink period (e.g. DwPTS), a guard period (e.g. GP), and an uplink period (e.g. UpPTS). Table 2 shows an example of a special subframe configuration.

The above-described radio frame structure is exemplary. Thus, the number of subframes in a radio frame, the number of slots in a subframe, or the number of symbols in a slot may be modified in various ways.

Figure 4:
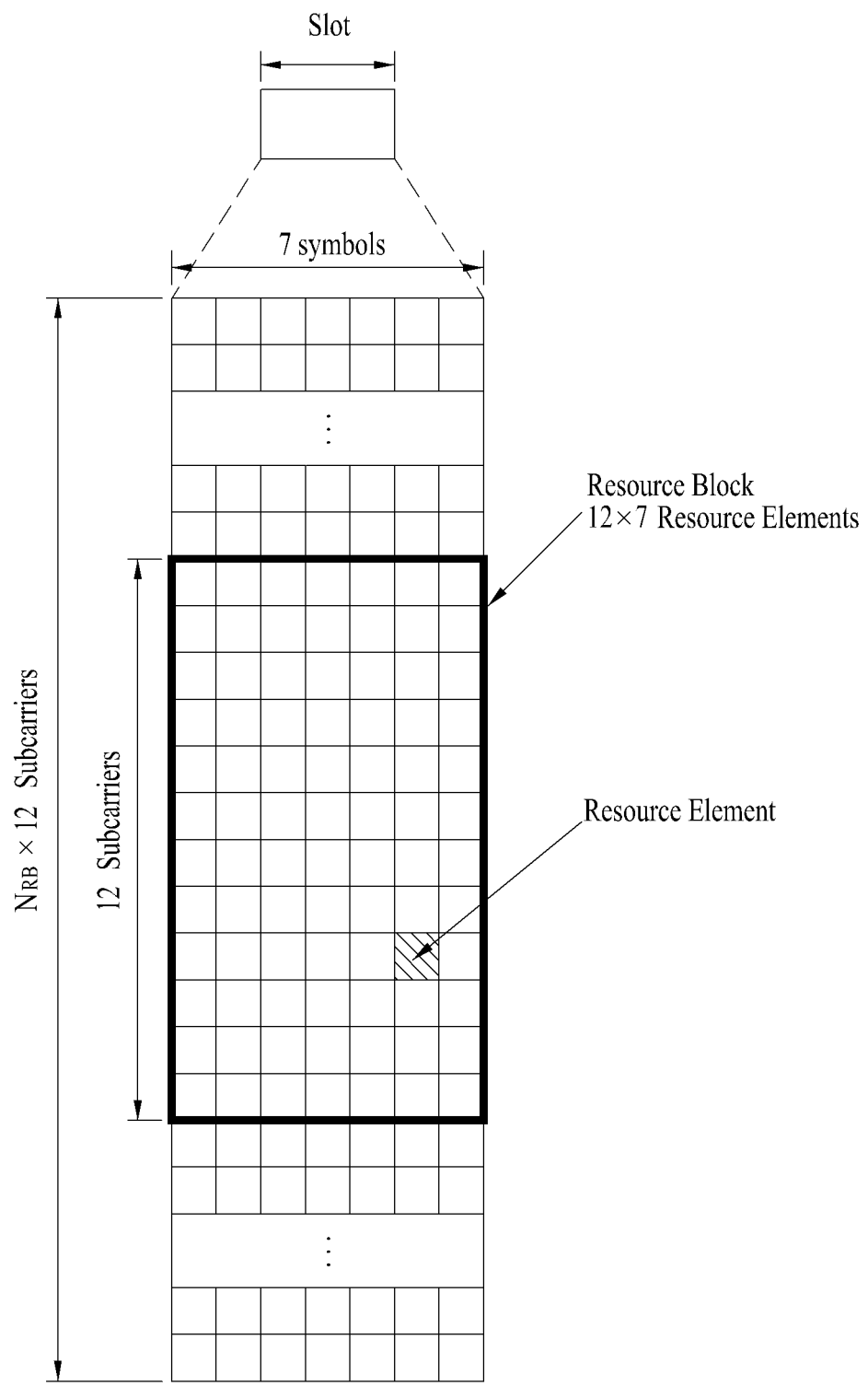
FIG. 4 illustrates a resource grid of one downlink slot.

FIG. 4 illustrates a resource grid of one downlink slot.

Referring to FIG. 4, a downlink slot includes a plurality of OFDM symbols in the time domain. One downlink slot may include 7 OFDM symbols and one resource block (RB) may include 12 subcarriers in the frequency domain. An example as illustrated in FIG. 4 may be applied to a normal CP case, while one downlink slot may include 6 OFDM symbols in the time domain in case of an extended CP case. Each element of the resource grid is referred to as a Resource Element (RE). An RB includes 12×7 REs. The number of RBs in a downlink slot, $N_{DL}$ depends on a downlink transmission bandwidth. The structure of an uplink slot may have the same structure as a downlink slot.

Figure 5:
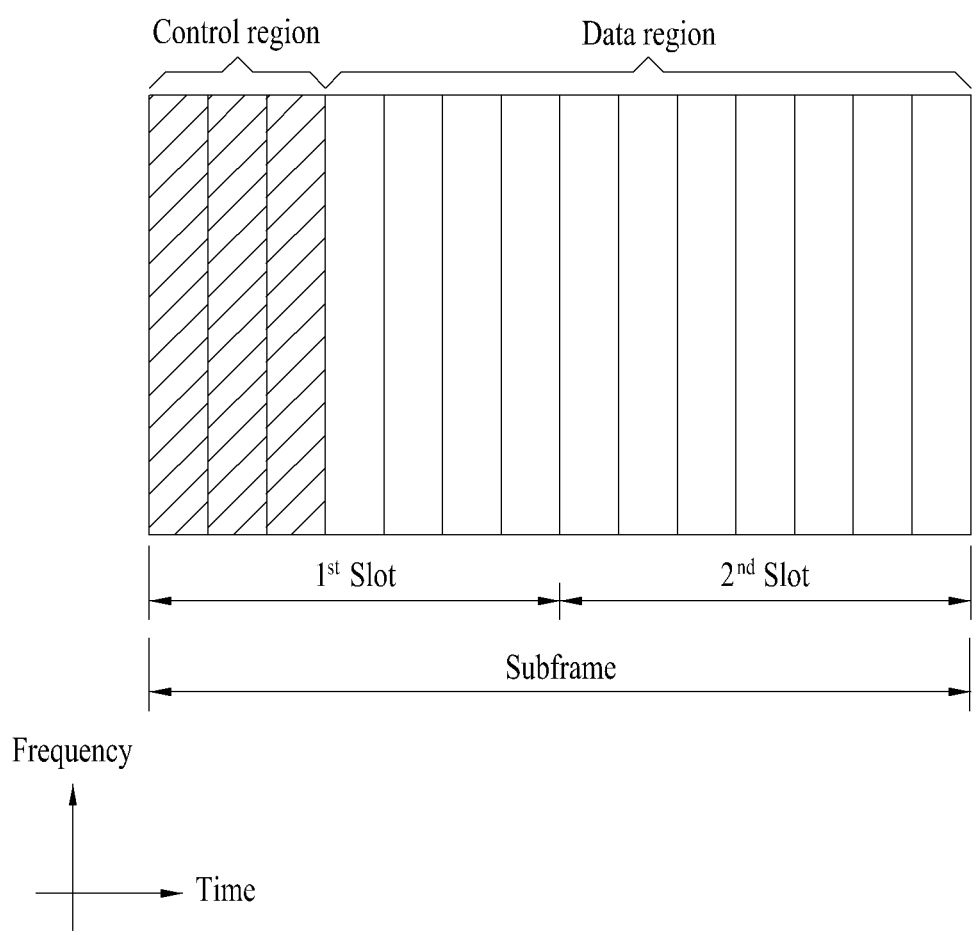
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first OFDM symbol of a subframe and carries information regarding the number of OFDM symbols used for transmission of control channels within the subframe. The PCFICH is composed of four resource element groups (REGs) each of which is uniformly distributed in a control region based on a cell ID. The PCFICH indicates a value of 1 to 3 (or 2 to 4) and is modulated using quadrature phase shift keying (QPSK).

PDCCH carries a transmission format or resource allocation information of downlink shared channel (DL-SCH), a transmission format or resource allocation information of uplink shared channel (UL-SCH), paging information on paging channel (PCH), system information on DL-SCH, resource allocation information of an upper layer control message such as random access response transmitted on PDSCH, a set of Tx power control commands for individual UEs within a UE group, Tx power control command, activation indication information of Voice over IP (VoIP), etc. The PDCCH is allocated in the first n OFDM symbols

TABLE 2

| | Normal cyclic prefix in downlink | | | Extended cyclic prefix in downlink | | |
|---|---|---|---|---|---|---|
| Special subframe configuration | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

(hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. For example, DCI format may selectively include exemplary fields shown in Table 3. In Table 3, a bit size of each information field is a non-limiting example.

TABLE 3

| Field | Bit(s) |
|---|---|
| Flag for determining DCI format 0/1A | 1 |
| Hopping flag | 1 |
| RB assignment | $\lceil \log_2 (N_{RB}^{UL}(N_{RB}^{UL} + 1)/2) \rceil$ |
| MCS (Modulation and coding scheme) and RV (Redundancy Version) | 5 |
| NDI (New Data Indicator) | 1 |
| TPC (Transmit Power Control) command for scheduled PUSCH | 2 |
| Cyclic shift for DM RS | 3 |
| UL index (TDD) | 2 |
| CQI request | 1 |

The flag field is an information field for identifying between DCI format 0 and DCI format 1A. That is, DCI format 0 and DCI format 1A have the same payload size and are identified by the flag field. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 may depend upon uplink bandwidth. DCI format 1A includes an information field for PDSCH allocation. The payload size of DCI format 1A may depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

The TPC field includes a power control command or value for PUSCH transmission, PUCCH transmission, or PRACH transmission at a UE. The TPC field is given by an absolute value or a relative value. The relative value may be accumulated to the current value of transmission power. When the current value of transmission power is the maximum transmission power of UE, a positive value of TPC may not be accumulated. When the current value of transmission power is the minimum transmission power of UE, a negative value of TPC may not be accumulated.

A base station determines a PDCCH format according to DCI to be transmitted to a UE, and attaches a cyclic redundancy check (CRC) to control information. The CRC is masked with an identifier (e.g. a radio network temporary identifier (RNTI)) according to an owner or usage of the PDCCH. For example, if the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted within one subframe. A UE may monitor the plurality of PDCCHs. PDCCH is transmitted on an aggregation of one or several consecutive control channel elements (CCEs). A CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. Each PDCCH is transmitted using one or more control channel elements (CCEs) and each CCE corresponds to 9 sets of 4 resource elements. The 4 resource elements are referred to as a resource element group (REG). 4 QPSK symbols are mapped to one REG. A resource element allocated to a reference signal is not included in an REG and thus a total number of REGs in a given OFDM symbol varies according to whether a cell-specific reference signal is present.

Table 4 exemplarily shows the number of CCEs, the number of REGs, and the number of PDCCH bits according to PDCCH format.

TABLE 4

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are consecutively numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. The limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, if a CRC error is not detected when the PDCCH is de-masked using the C-RNTI, the UE has detected its own PDCCH. The UE-specific search space (USS) is separately configured for each UE and a scope of common search space (CSS) is known to all UEs. The USS and the CSS may be overlapped with each other. When a significantly small search space is present, if some CCE positions are allocated in a search space for a specific UE, the remaining CCEs are not present. Thus a base station may not find CCE resources in which the PDCCH is to be transmitted to all available UEs in a given subframe. In order to minimize the possibility that such blocking is subsequent to a next subframe, a start position of the USS is UE-specifically hopped.

Table 5 shows sizes of CSS and USS.

TABLE 5

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To appropriately control computational load of blind decoding, the UE is not required to simultaneously search for all defined DCI formats. In general, the UE always searches for formats 0 and 1A in USS. Formats 0 and 1A have the same size and are discriminated from each other by a flag in a message. The UE may need to receive an additional format (e.g. format 1, 1B or 2 according to PDSCH transmission mode configured by a base station). The UE searches for formats 1A and 1C in CSS. Furthermore, the UE may be configured to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission
DCI Format
Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1B: Compact resource allocation for PDSCH (mode 6) using rank-1 closed-loop precoding
Format 1C: Very compact resource allocation for PDSCH (e.g., paging/broadcast system information)
Format 1D: Compact resource allocation for PDSCH (mode 5) using multi-user MIMO
Format 2: Resource allocation for PDSCH (mode 4) of closed-loop MIMO operation
Format 2A: Resource allocation for PDSCH (mode 3) of open-loop MIMO operation
Format 3/3A: Power control command with 2-bit/1-bit power adjustments for PUCCH and PUSCH
Format 4: Resource grant for PUSCH transmission (uplink) in a cell configured in a multi-antenna port transmission mode A UE may be semi-statically configured via higher layer signaling to receive PDSCH data transmission that is scheduled by the PDCCH according to 10 transmission modes.

PHICH carries an HARQ ACK/NACK signal in response to uplink transmission. The PHICH is allocated to remaining REGs other than CRS and PCFICH (the first OFDM symbol) in one or more OFDM symbols configured by PHICH duration. The PHICH is allocated to 3 REGs which are maximally distributed in the frequency domain.

A plurality of PHICHs may be mapped to the same resource element group (e.g., REG) and construct a PHICH group. Each of the PHICHs within the same PHICH group may be distinguished by an orthogonal sequence. A PHICH resource may be identified by an index pair ($n_{PHICH}^{group}$, $n_{PHICH}^{seq}$). In this case, $n_{PHICH}^{group}$ indicates the PHICH group number and $n_{PHICH}^{seq}$ indicates an orthogonal sequence index within the PHICH group. $n_{PHICH}^{group}$ and $n_{PHICH}^{seq}$ may be confirmed using a lowest PRB (Physical Resource Block) index among PRB indexes allocated for the PUSCH transmission and a cyclic shift of DMRS transmitted through UL grant. Formula 1 shows an example of finding $n_{PHICH}^{group}$ and $n_{PHICH}^{seq}$.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

[Formula 1]

In Formula 1, $n_{DMRS}$ is mapped from a cyclic shift value for DMRS. $N_{SF}^{PHICH}$ indicates a spreading factor size used for PHICH. $I_{PRB\_RA}$ may be determined as $I_{PRB\_RA}^{lowest\_index}$ for the first transport block of a PUSCH, and may be determined as $I_{PRB\_RA}^{lowest\_index}+1$ for the second transport block of the PUSCH. $I_{PRB\_RA}^{lowest\_index}$ indicates a lowest PRB index for PUSCH transmission. $N_{PHICH}^{group}$ indicates the number of PHICH groups. $I_{PHICH}$ has a value of 0 or 1 according to a frame type or subframe type.

Table 6 exemplarily shows a mapping between $n_{DMRS}$ and a cyclic shift value in a DMRS field.

TABLE 6

| Cyclic Shift for DMRS Field in PDCCH with uplink DCI format in [4] | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In case of FDD frame (frame structure type 1), the number $N_{PHICH}^{group}$ of PHICH groups is constant for all subframes, and the number of the PHICH groups in one subframe is given by Formula 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g \in \{1/6, 1/2, 1, 2\}$ is provided by a higher layer and the $N_{RB}^{DL}$ indicates the number of resource blocks (RBs) on a DL band. In case of TDD frame (frame structure type 2), the number of PHICH groups may vary for each DL subframe and may be given as $m_i \cdot N_{PHICH}^{group}$.

Table 7 represents $m_i$.

TABLE 7

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

When a packet is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals may be classified into a reference signal for acquiring channel information and a reference signal used for data demodulation. The former is for a UE to acquire channel information in downlink, the reference signal for acquiring channel information is transmitted in wideband, and a UE which does not receive downlink data in a specific subframe receives the reference signal. Further, this reference signal is used in a handover situation. The latter is a reference signal transmitted together when a base station transmits a downlink signal, and enables a UE to demodulate the downlink signal using the reference signal. The reference signal used for data demodulation is required to be transmitted in a data transmission region.

Downlink reference signal includes:
i) a cell-specific reference signal (CRS) shared by all UEs in a cell;
ii) a UE-specific reference signal for a specific UE only;
iii) a demodulation reference signal (DM-RS) transmitted for coherent demodulation when a PDSCH is transmitted;
iv) a channel state information reference signal (CSI-RS) for delivering channel state information (CSI) when a downlink DMRS is transmitted;
v) a multimedia broadcast single frequency network (MB-SFN) reference signal transmitted for coherent demodulation of a signal transmitted in MBSFN mode; and
vi) a positioning reference signal used to estimate geographic position information of a UE.

Figure 6:
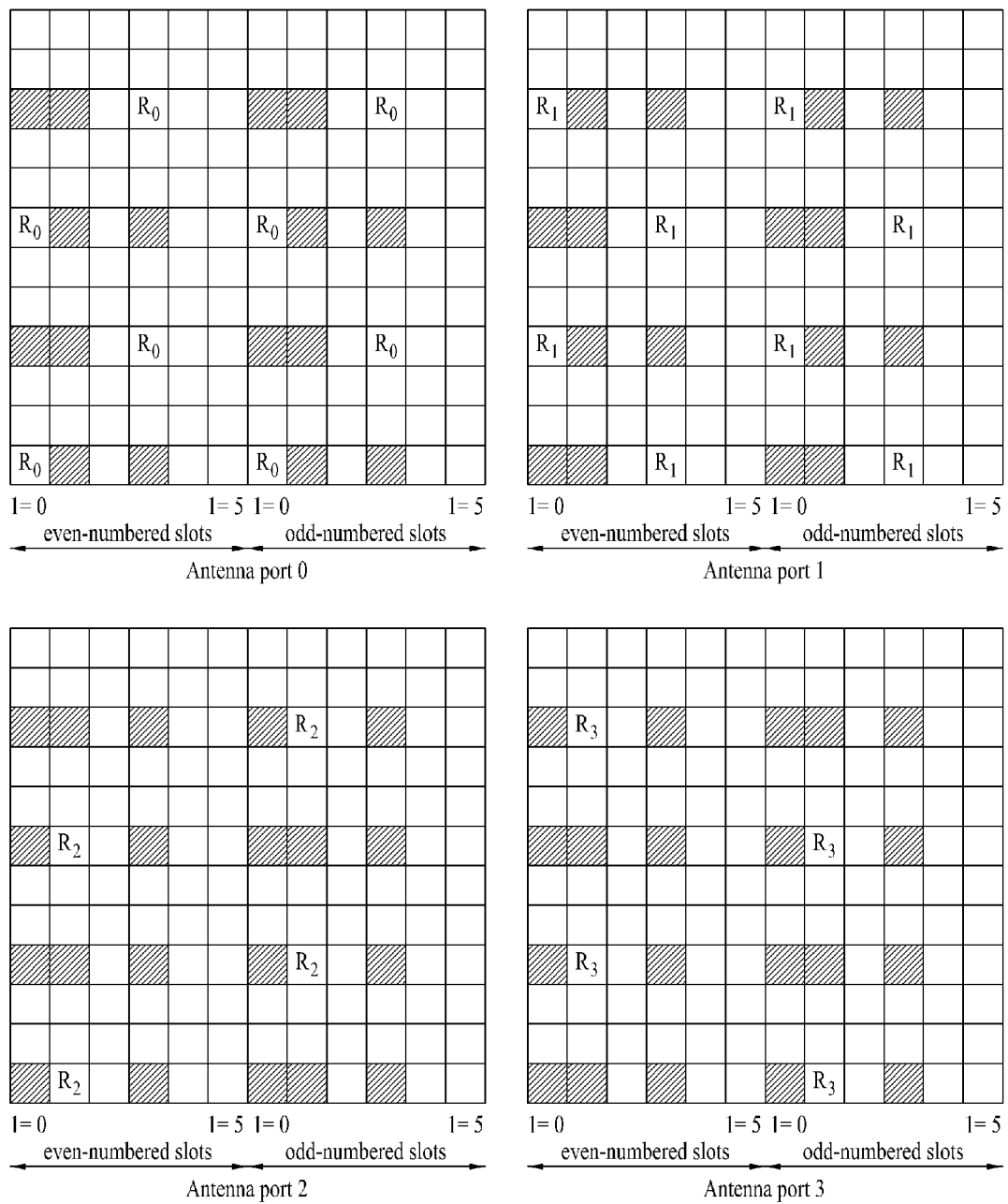
FIG. 6 illustrates cell specific reference signal (CRS) mapping patterns according to antenna ports.

FIG. 6 illustrates cell specific reference signal (CRS) mapping patterns according to antenna ports. The CRS is used for obtaining channel information and demodulating data, and a UE-specific reference signal is used for demodulating data. The CRS is transmitted for wideband in every subframe, and the reference signal for up to four (4) antenna ports is transmitted according to the number of the transmission antennas of the eNB.

A reference signal sequence $r_{l,n_s}(m)$ for CRS may be obtained by Equation 3.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$

$$m = 0, 1, \ldots, 2N_{RB}^{max,DL} - 1$$

In Equation 3, $n_s$ denotes a slot number within a radio frame, l denotes a symbol number within a slot. $N_{RB}^{max,DL}$ denotes the number of RBs allocated for the maximum downlink bandwidth. For example, c(i) is a pseudo random sequence and may be obtained by Equation 4.

$$c(n) = (x_1(n+N_C) + x_2(n+N_C)) \bmod 2 \quad \text{[Equation 4]}$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

c(i) may be initialized by Equation 5, and, in Equation 5, $$N_{CP} = \begin{cases} 1 & \text{for normal } CP \\ 0 & \text{for extended } CP \end{cases}$$

and $N_{ID}^{cell}$ represents a cell ID (identity).

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} \quad \text{[Equation 5]}$$

The generated reference signal sequence $r_{l,n_s}(m)$ is mapped to a complex valued modulation symbol $a_{k,l}^{(p)}$, where $a_{k,l}^{(p)}$ represents a resource element for antenna port p.

$$a_{k,l}^{(p)} = r_{l,n_s}(m') \text{ where} \quad \text{[Equation 6]}$$

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In Equation 6, (k, l) denotes a resource element (RE) to which a reference signal symbol is mapped, k denotes a frequency domain index of the resource element, and l denotes a time domain index of the resource element. v and $v_{shift}$ defines a position of reference signals, and v may be give by Equation 7. $v_{shift}$ represents a cell-specific frequency shift, and may be give by a higher-layer signaling (e.g. RRC signaling) or $N_{ID}^{cell}$ mod 6.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 7]}$$

Referring to FIG. 6, R1 to R4 represents cell-specific reference signals or cell-common reference signals (CRSs) for antenna ports 0 to 3, respectively. Cell specific reference signals (CRSs) R1 to R4 may be mapped to time-frequency resources by the above-described procedure. CRS is transmitted in the entire band for each subframe, and has a predefined and fixed pattern within a subframe. CRS is used for channel estimation and downlink signal demodulation. Further, a specific antenna port may be used according to the number of used antenna ports. For example, in case that the number of antenna ports is 1, CRS for antenna port 0 may be transmitted and time-frequency resources for the other antenna ports may be used for transmitting another signals. That is, resources to which R1, R2, R3 are mapped may be used for transmitting another signals. In another example, in case that the number of antenna ports is 2, CRSs for antenna ports 0, 1 may be transmitted and time-frequency resources (e.g. R2, R3) for the other antenna ports may be used for transmitting another signals. In still another example, in case that the number of antenna ports is 4, CRSs for antenna ports 0-3 may be transmitted.

FIG. 7 illustrates mapping patterns of demodulation reference signal (DMRS) according to antenna ports. A DMRS is a reference signal defined for a UE to perform channel estimation with respect to a PDSCH. The DMRS may be referred to as a UE-specific reference signal. The DMRS can be used in transmission modes 7, 8 and 9. The DMRS was initially defined for single layer transmission of antenna port #5 and then extended for spatial multiplexing of a maximum of 8 layers. The DMRS is transmitted for a specific UE only and thus can be transmitted in an RB through which a PDSCH for the specific UE is transmitted.

A reference signal sequence r(m) for DMRS may be given by Equation 8 for antenna port 5.

$$r_{n_s}(m) = \frac{1}{\sqrt{2}}(1 - 2 \cdot c(2m)) + j\frac{1}{\sqrt{2}}(1 - 2 \cdot c(2m + 1)), \quad \text{[Equation 8]}$$
$$m = 0, 1, \ldots, 12N_{RB}^{PDSCH} - 1$$

In Equation 8, $N_{RB}^{PDSCH}$ denotes the number of resource blocks (RBs) in a bandwidth for PDSCH transmission. c(i) may be given by Equation 4. c(i) may be initialized by Equation 9, and, in Equation 9, $n_{RNTI}$ represents a identifier (e.g. radio network temporary identifier (RNTI)) masked to CRC of PDSCH, $N_{ID}^{cell}$ represents a cell ID (identity).

$$c_{init} = (\lfloor n_s/2 \rfloor + 1) \cdot (2N_{ID}^{cell} + 1) \cdot 2^{16} + n_{RNTI} \quad \text{[Equation 9]}$$

For the other antenna port (antenna port 7 or higher), a reference signal sequence r(m) for DMRS may be given by Equation 10.

$$r(m) = \frac{1}{\sqrt{2}}(1 - 2 \cdot c(2m)) + j\frac{1}{\sqrt{2}}(1 - 2 \cdot c(2m + 1)), \quad \text{[Equation 10]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

$N_{RB}^{max,DL}$ denotes the number of RBs allocated in the maximum downlink bandwidth. c(i) may be given by Equation 4. c(i) may be initialized by Equation 11.

$$c_{init} = (\lfloor n_s/2 \rfloor + 1) + (n_{ID}^{(nSCID)} + 1) \cdot 2^{16} + n_{SCID} \quad \text{[Equation 11]}$$

In Equation 11, $n_{SCID}$ represents a scrambling ID (identity), and has a value of 0 unless specified. For example, in case of PDSCH transmission through antenna port 7 or 8, $n_{SCID}$ may be given by DCI format 2B, 2C, or 2D related to a corresponding PDSCH transmission. For example, in case that $n_{SCID}$ is given by DCI format 2B, $n_{SCID}$ is determined according to a value of scrambling ID field in DCI format 2B. $n_{ID}^{(i)}$ may be given by a higher layer, otherwise $N_{ID}^{(i)}$ may be determined to be $N_{ID}^{cell}$.

Figure 8:
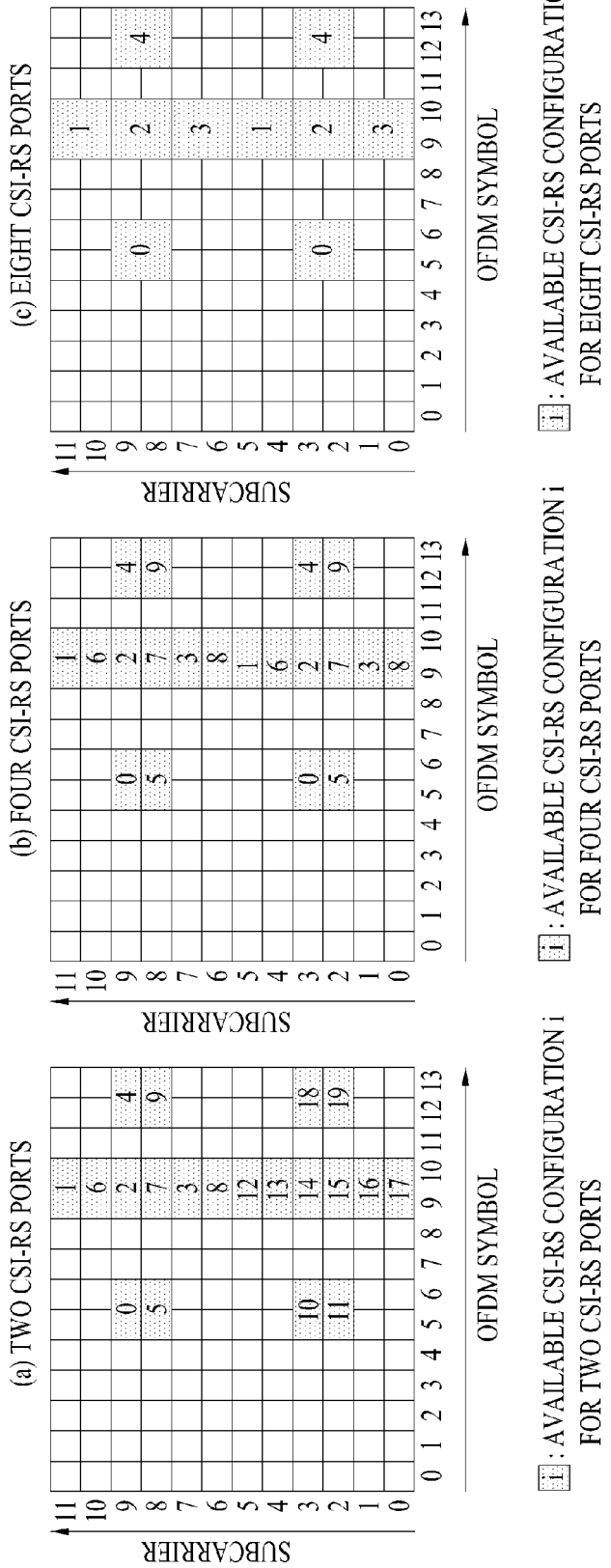
FIG. 8 illustrates mapping patterns for CSI-RS according to antenna ports.

FIG. 8 illustrates mapping patterns for CSI-RS according to antenna ports. A time-frequency resource to/through which a CSI-RS is allocated/transmitted is referred to as a CSI-RS resource, and positions of resources in a predetermined resource region, in which CSI-RSs are transmitted, are referred to as a CSI-RS pattern or CSI-RS resource configuration. In addition, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15, 16, p=15, . . . , 18 and p=15, . . . , 22), distinguished from the CRS, and is defined for Δf=15 kHz only. Antenna ports p=15, . . . , 22 may respectively correspond to CSI-RS ports p=0, . . . , 7 in the following description.

A reference signal sequence for CSI-RS is similar to a reference signal sequence for CRS, except that Equation 12 is used for CSI-RS instead of Equation 5.

$$c_{init} = 2^{10} \cdot (7 \cdot (n_s + 1) + l + 1) \cdot (2 \cdot N_{ID}^{CSI} + 1) + 2 \cdot N_{ID}^{CSI} + N_{CP} \quad \text{[Equation 12]}$$

In Equation 12, $N_{ID}^{CSI}$ is identical to $N_{ID}^{cell}$ unless given by a high layer (e.g. RRC). The generated reference signal sequence may be mapped to time-frequency resources according to Equation 13. The reference signal sequence is mapped to a complex valued modulation symbol $a_{k,l}^{(p)}$, where $a_{k,l}^{(p)}$ is used as a reference signal symbol for antenna port p.

$$a_{k,l}^{(p)} = w_{l''} \cdot r_{l,n_s}(m') \text{ where}$$ [Equation 13]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k, l) represents a resource element (RE) to which a reference signal symbol is mapped, k represents a frequency domain index of a resource element, and l represents a time domain index of a resource element. $n_s$ denotes a slot number within a radio frame. k' and l' may be given according to CSI-RS configuration.

Tables 8 and 9 show CSI-RS configurations that can be used in a frame structure (e.g. radio frame type 1) for FDD (frequency division duplex) and a frame structure (e.g. radio frame type 2) for TDD (time division duplex). Table 8 shows CSI-RS configurations for normal CP and Table 7 shows CSI-RS configurations for extended CP. Time-frequency resources to which CSI_RS is mapped may be determined according to Equation 13 and Table 8 or 9.

TABLE 8

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |

TABLE 8-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 9

| | CSI reference | Number of CSI reference signals configured | | | | | |
|---|---|---|---|---|---|---|---|
| | signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to FIG. 8, FIG. 8(a) illustrates 20 CSI-RS configurations available for CSI-RS transmission through 2 CSI-RS ports, FIG. 8(b) illustrates 10 CSI-RS configurations available for CSI-RS transmission through 4 CSI-RS ports, and FIG. 8(c) shows 5 CSI-RS configurations available for CSI-RS transmission through 8 CSI-RS ports. CSI-RS configurations defined on the basis of the number of CSI-RS ports may be numbered.

When a base station is configured with 2 antenna ports for CSI-RS transmission, CSI-RS transmission is performed in a radio resource corresponding to one of the 20 CSI-RS configurations as illustrated in FIG. 8(a). When 4 CSI-RS ports are configured for a specific cell, CSI-RSs are transmitted in resources corresponding to CSI-RS configurations for the specific cell from among the 10 CSI-RS configurations as illustrated in FIG. 8(b). Likewise, when 8 CSI-RS ports are configured for the specific cell, CSI-RSs are transmitted in resources corresponding to CSI-RS configurations for the specific cell from among the 5 CSI-RS configurations as illustrated in FIG. 8(c).

CSI-RS configurations shown in Tables 8 and 9 have a nested property. The nested property means that a CSI-RS configuration for a large number of CSI-RS ports becomes a super set of a CSI-RS configuration for a small number of CSI-RS ports. Referring to FIGS. 8(b) and 8(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per every subframe. In this case, CSI-RS transmission overhead can be remarkably reduced, compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 10 shows CSI-RS transmission periodicity $T_{CSI-RS}$ and subframe offset $\Delta_{CSI-RS}$.

TABLE 10

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

In Table 10, $I_{CSI-RS}$ is a CSI-RS subframe configuration index, and specifies CSI-RS transmission periodicity and subframe offset. The base station may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \quad \text{[Equation 14]}$$

In Equation 14, $n_f$ denotes a system frame number, and $n_s$ represents a slot number within a radio frame. For example, referring to Table 10, when $I_{CSI-RS}$ is greater than 5 and less than 14, a CSI-RS is transmitted every 10 subframes, starting from a subframe corresponding to a subframe number ($I_{CSI-RS}$-5).

A base station may notify a UE of the following parameters through higher layer signaling (e.g. RRC signaling).
  CSI-RS resource configuration ID (identity) in case that transmission mode 10 is configured for UE
  Number of CSI-RS ports
  CSI-RS configuration (for example, refer to Tables 8 and 9)
  CSI-RS subframe configuration $I_{CSI-RS}$ (for example, refer to Table 10)
  UE assumption of reference PDSCH transmission power Pc for CSI feedback in case that transmission mode 9 is configured for UE, where Pc is a ratio of PDSCH EPRE (Energy Per Resource Element) to CSI-RS EPRE when UE derives the CSI feedback
  UE assumption of reference PDSCH transmission power Pc for each CSI process in case that transmission mode 10 is configured for UE The base station may notify the UE of a CSI-RS configuration transmitted with zero power and a subframe configuration for transmission of a zero power CSI-RS configuration as necessary. The CSI-RS configurations of Tables 8 and 9 may be used as the zero power CSI-RS configuration, and the CSI-RS subframe configuration of Table 10 may be used as the subframe configuration for transmission of the zero power CSI-RS.

Figure 9:
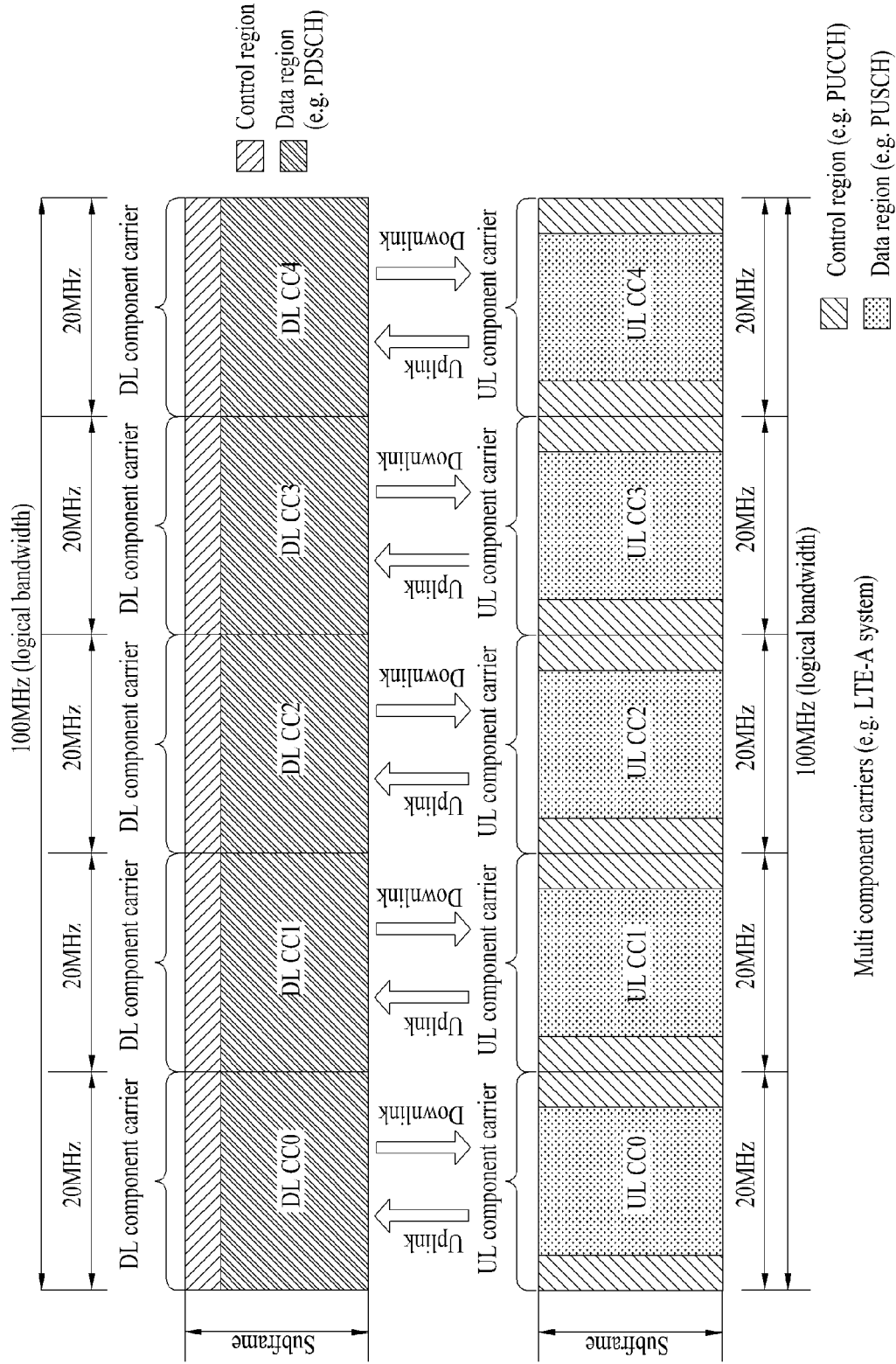
FIG. 9 illustrates an example of a carrier aggregation (CA) communication system.

FIG. 9 illustrates an example of a carrier aggregation (CA) communication system.

Referring to FIG. 9, a wider UL/DL bandwidth may be supported in a manner of collecting a plurality of UL/DL component carriers (CCs). A technology of collecting and using a plurality of the component carriers is referred to as a carrier aggregation or bandwidth aggregation. A component carrier can be comprehended as a carrier frequency (or center carrier, center frequency) for a corresponding frequency block. Each of a plurality of the component carriers can be adjacent or non-adjacent to each other in frequency domain. A bandwidth of each component carrier can be independently determined. It may configure an asymmetrical carrier aggregation of which the number of UL CCs is different from the number of DL CCs. For instance, there are 2 DL CCs and 1 UL CC, asymmetrical carrier aggregation can be configured in a manner that the DL CC corresponds to the UL CC by 2:1. A link between a DL CC and an UL CC is fixed in a system or can be semi-statically configured. Although a whole system band consists of N number of CCs, a frequency band capable of being monitored/received by a specific user equipment can be restricted to M (≤N) number of CCs. Various parameters for carrier aggregation can be configured by a cell-specific, a UE group-specific or a UE-specific scheme.

Meanwhile, control information can be configured to be transmitted and received on a specific CC only. Such specific CC is referred to as a primary CC (PCC) and the rest of CCs are referred to a secondary CC (SCC). The PCC can be used for a user equipment to perform an initial connection establishment process or a connection re-establishment process. The PCC may correspond to a cell indicated in a handover process. The SCC can be configured after an RRC connection is established and can be used to provide an additional radio resource. As an example, scheduling information can be configured to be transceived via a specific CC only. This sort of scheduling scheme is called cross-carrier scheduling (or cross-CC scheduling). If the cross-CC scheduling is applied, PDCCH for DL assignment is transmitted on a DL CC #0 and corresponding PDSCH can be transmitted on a DL CC #2. The term 'component carrier' may be replaced with a different equivalent terminology such as a carrier, a cell or the like. For example, PCC and SCC may be interchangeably used with PCell and SCell, respectively.

As described above with reference to FIG. 4 and FIG. 5, first n number of OFDM symbols of a subframe are used to transmit PDCCH, PHICH, PCFICH and the like corresponding to physical channels configured to transmit various control information and the rest of OFDM symbols are used to transmit PDSCH in LTE (-A) system. However, LTE system after LTE release 11 has a limited capability for PDSCH transmission because OFDM symbols are limited due to PDCCH performance decrease resulting from lack of PDCCH capability and inter-cell interference in case of coordinate multi-point (CoMP), multi user-multiple input multiple output (MU-MIMO). Hence, a system (e.g., a system appearing after 3GPP TS 36 series release 11) appearing after LTE (-A) is introducing an enhanced PDCCH (E-PDCCH), which is more freely multiplexed with PDSCH.

Figure 10:
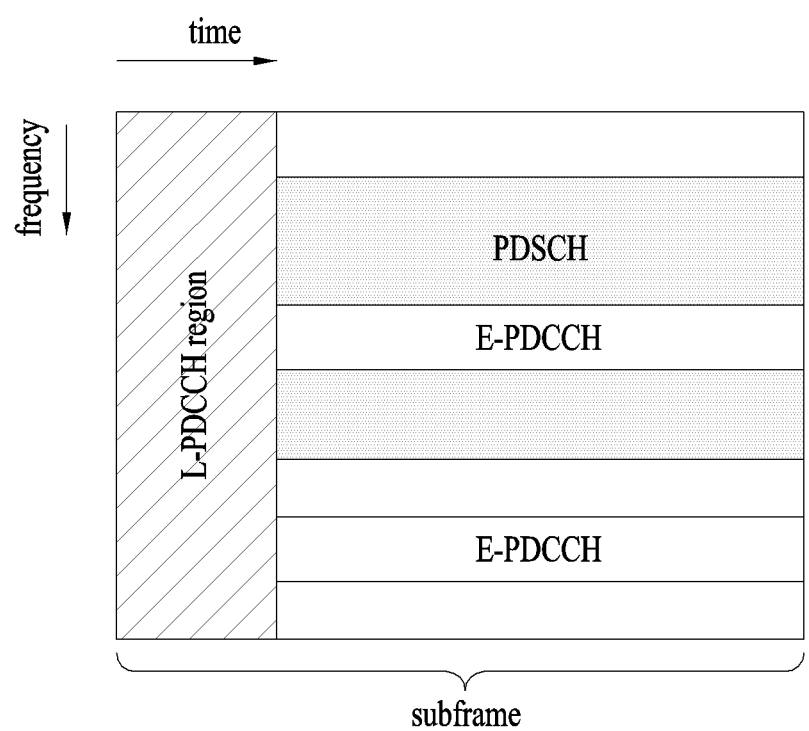
FIG. 10 illustrates an example of allocating E-PDCCH in a subframe.

FIG. 10 illustrates an example of allocating E-PDCCH in a subframe.

Referring to FIG. 10, a PDCCH (for convenience, legacy PDCCH or L-PDCCH) used in the LTE(-A) system may be allocated to a control region of a subframe. In the figure, an L-PDCCH region refers to a region to which the legacy PDCCH is allocated. In the context, the L-PDCCH region may refer to a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 6). The PDCCH allocated to the data region is referred to as an E-PDCCH.

As illustrated, a channel resource may be additionally ensured through the E-PDCCH to alleviate scheduling restrictions due to limited control channel resource of an L-PDCCH region.

In detail, the E-PDCCH may be detected/demodulated based on a DM-RS. The E-PDCCH may be configured to be transmitted over a PRB pair on a time axis. In more detail, a search space (SS) for E-PDCCH detection may be configured with one or more (e.g., 2) E-PDCCH candidate sets. Each E-PDCCH set may occupy a plurality of (e.g., 2, 4, or 8) PRB pairs. An enhanced-CCE (E-CCE) constructing an E-PDCCH set may be mapped in the localized or distributed form (according to whether one E-CCE is distributed in a plurality of PRB pairs). In addition, when E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and attempt DCI detection on an L-PDCCH CSS and an L-PDCCH USS in a subframe (non-E-PDCCH subframe) in which transmission/detection of E-PDCCH is not configured.

In case of the E-PDCCH, in terms of one UE, a USS may include K E-PDCCH set(s) (for each CC/for each cell). K may be greater than or equal to 1 and equal to or smaller than a specific upper limit (e.g., 2). In addition, each E-PDCCH set (within a PDSCH region) may comprise N PRBs. Here, N and PRB resource/index configured with the N PRBs may be independently (i.e., set-specifically) allocated for each respective E-PDCCH set. Accordingly, the number and index of E-CCE resources configured with each E-PDCCH set may be configured (UE-specially and) set-specifically. A PUCCH resource/index linked to each E-CCE resource/index may also be allocated (UE-specifically and) set-specifically by independently configuration a start PUCCH resource/index for each respective E-PDCCH set. Here, the E-CCE may refer to a basic control channel unit of an E-PDCCH including a plurality of REs (within a PRB in a PDSCH region). The E-CCE may have different structures according to an E-PDCCH transmission form. For example, an E-CCE for localized transmission may be configured using an RE belonging in the same PRB pair. On the other hand, an E-CCE for distributed transmission may be configured with an RE extracted from a plurality of PRB pairs. In the case of the localized E-CCE, in order to perform optimum beamforming on each user, an antenna port (AP) may be independently used for each respective E-CCE resource/index. On the other hand, in the case of distributed E-CCE, the same antenna port set may be repeatedly used in different E-CCEs such that a plurality of users may commonly use antenna ports.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar to in steps S207 and S208 of FIG. 2. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The LTE(-A) system pre-reserves a PDCCH candidate region (hereinafter, a PDCCH search space) in a control region and transmits a PDCCH of a specific UE to a partial region of the PDCCH candidate region. Accordingly, the UE may acquire a PDCCH of the UE in the PDCCH search space via blind decoding. Similarly, the E-PDCCH may be transmitted over a partial or entire portion of a pre-reserved resource.

In the mean time, in a long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes use a single frequency in order to simultaneously perform synchronized transmission, frequency resources can be saved and spectrum efficiency can be raised.

UE can be aware of which subframes are reserved for MBSFN by receiving a higher layer signal indicating MBSFN subframes. The higher layer signal defining subframes reserved for the MBSFN in downlink (hereinafter, MBSFN subframes) may be referred to as MBSFN subframe configuration information. The MBSFN subframe configuration information may include the following information.

- an allocation period of radio frames including an MBSFN subframe
- an allocation offset specifying the start location of the radio frames including the MBSFN subframe
- information indicating a subframe allocated as the MBSFN subframe in one or more radio frames from among the radio frames indicated by the allocation period and the allocation offset.

Figure 11:
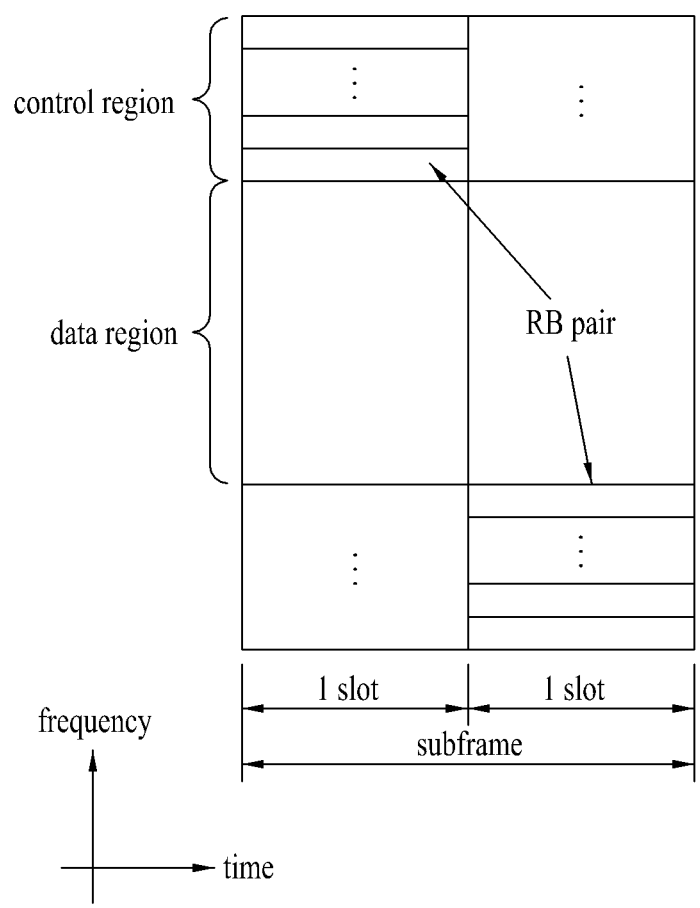
FIG. 11 illustrates a structure of an uplink subframe.

FIG. 11 illustrates a structure of an uplink subframe.

Referring to FIG. 11, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP, and a slot may comprise 6 SC-FDMA symbols in case of extended CP. An uplink subframe is divided into a data region and a control region. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis (e.g. RB pair located frequency mirrored positions), and performs hopping on the border of the slots. The uplink control information (UCI) includes HARQ ACK/NACK, CQI (Channel Quality Indicator), a precoding matrix indicator (PMI), a rank indicator (RI), etc.

Figure 12:
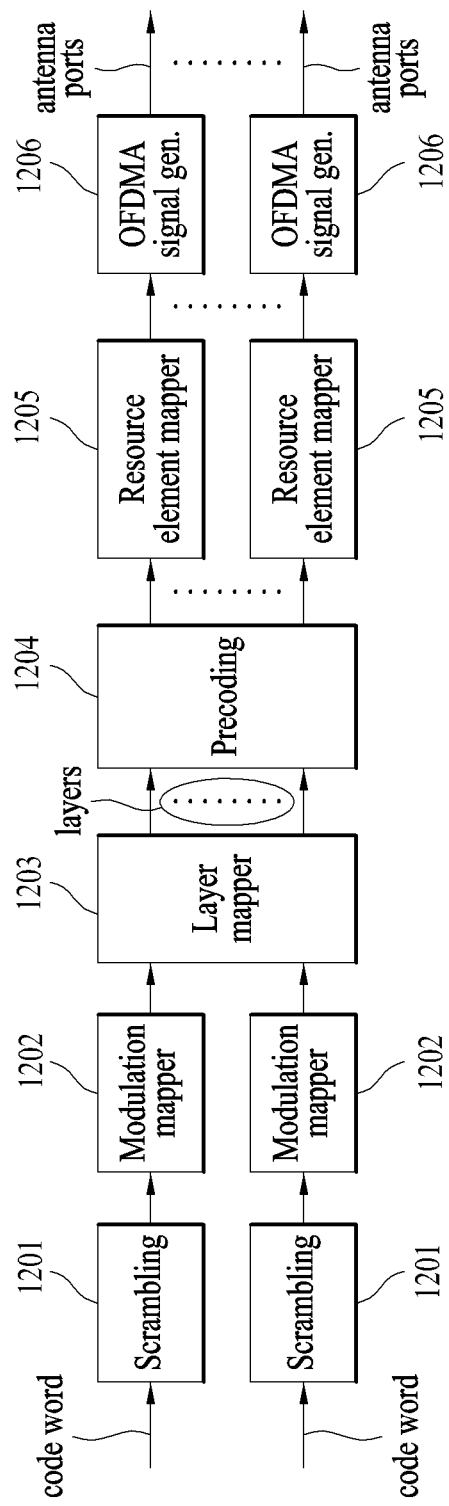
FIG. 12 illustrates a signal processing procedure for PUSCH transmission by a UE.

FIG. 12 illustrates a signal processing procedure for PUSCH transmission by a UE.

A UE may transmit one or more codewords formed by a higher layer (e.g. MAC layer) through a physical layer. The one or more codewords may be formed using data (including control information of a higher layer), and may be transmitted via a physical uplink shared channel (PUSCH). In order to transmit the PUSCH, a scrambling module 1201 of the UE may scramble a transmission signal using a specific scrambling signal. The scrambled signal is input to a modulation mapper 1202, and is modulated to a complex symbol using BPSK (Binary Phase Shift Keying), QPSK (Quadrature Phase Shift Keying), or 16QAM/64QAM (Quadrature Amplitude Modulation) scheme according to a type of the transmission signal and/or channel status. The modulated complex symbol may be mapped to one or more layers by a layer mapper 1203. Each layer may be precoded by a precoding module 1204, for example by multiplying a precoding matrix, and may be allocated to each transmission antenna. The transmission signal allocated per each antenna may be mapped to time-frequency resources by a resource element mapper 1205. Then, the transmission signal may be transmitted through a SC-FDMA signal generator 1206 and through each antenna. A base station may restore the signal transmitted from UE by performing a procedure corresponding to the above-described procedure in a reverse order.

In case of uplink, single carrier-frequency division multiple access (SC-FDMA) is used to satisfy a single carrier characteristic in order to prevent a signal distortion due to PAPR. In contrast, in case of downlink, OFDMA is used because PAPR is not a problem in connection with performance of a base station. In this case, SC-FDMA signal generator 1206 is replaced by an OFDMA signal generator in a base station, and the rest of the procedure (1201 to 1205) may be performed in a same manner as FIG. 12.

A method of controlling, by a terminal, uplink transmission power of the terminal includes open loop power control (OLPC) and closed-loop power control (CLPC). OLPC serves to control power by estimating and compensating for downlink signal attenuation from a base station of a cell including a terminal, and controls uplink power by increasing uplink transmission power when a distance between the terminal and the base station increases and thus signal attenuation of a downlink increases. CLPC controls uplink power by directly transmitting information (that is, a control signal) used to adjust uplink transmission power in a base station.

PUSCH transmission power of UE may be determined according to Equation 15 when a serving cell only transmits a PUSCH rather than simultaneously transmitting both a PUSCH and a PUCCH in a subframe index in a system supporting carrier aggregation.

In Equation 15, $P_{CMAX,c}(i)$ represents maximum power available for transmission of UE in subframe i. In Equation 16, $\hat{P}_{CMAX,c}(i)$ represents a linear value of $P_{CMAX,c}(i)$. In Equation 16, $P_{PUCCH}(i)$ represents PUCCH transmission power in subframe i, and $\hat{P}_{PUCCH}(i)$ represents a linear value of $P_{PUCCH}(i)$.

$M_{PUSCH,c}(i)$ represents a parameter indicating a bandwidth of PUSCH resource allocation expressed by the number of valid resource blocks for the subframe i, and is a value allocated by a base station. $P_{O\_PUSCH,c}(j)$ is a parameter generated by adding a cell-specific nominal component $P_{O\_NOMINAL\_PUSCH,c}(j)$ provided from a higher layer to a UE-specific component $P_{O\_UE\_PUSCH,c}(j)$ provided from a higher layer, and is a value that a base station reports to a UE. j is 1 for PUSCH transmission/retransmission according to an uplink grant, and j is 2 for PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$, and parameters $P_{O\_PRE}$ and $\Delta_{PREAMBLE\_Msg3}$ are signaled through a higher layer.

$\alpha_c(j)$ is a path loss compensation factor, and is a cell-specific parameter provided by a higher layer and transmitted by a base station as 3 bits. $\alpha_c(j) \in \{0, 0.4, 0.5, 0.6, 0.7, 0.8, 0.9, 1\}$ when j is 0 or 1, and $\alpha_c(j)=1$ when j is 2. $\alpha_c(j)$ is a value that a base station reports to a terminal.

A path loss $PL_c$ is an estimate of a downlink path loss (or a signal loss) calculated in a unit of dB by a UE, and is expressed as $PL_c$=referenceSignalPower−higher layer filteredRSRP. Here, a base station may inform a UE of referenceSignalPower through a higher layer.

$f_c(i)$ is a value indicating a current PUSCH power control adjustment state for the subframe i, and may be expressed as a current absolute value or an accumulated value. When accumulation is enabled based on a parameter provided from a higher layer, or when a transmit power control (TPC) command $\delta_{PUSCH,c}$ is included in a PDCCH together with DCI format 0 for a serving cell c scrambled by a temporary C-RNTI, $f_c(i)=f_c(i-1)+\delta_{PUSCH,c}(i-K_{PUSCH})$. $\delta_{PUSCH,c}(i-K_{PUSCH})$ is signaled to a PDCCH together with DCI format 0/4 or 3/3A in subframe i. Here, $f_c(0)$ is an initial value after an accumulated value is reset.

A value $K_{PUSCH}$ is 4 for frequency division duplex (FDD). For TDD, a value $K_{PUSCH}$ may be given according to Table 11.

$$P_{PUSCH,c}(i) = \min \begin{cases} P_{CMAX,c}(i), \\ 10\log_{10}(M_{PUSCH,c}(i)) + P_{OPUSCH,c}(j) + \alpha_c(j) \cdot PL_c + \Delta_{TF,c}(i) + f_c(i) \end{cases} [dBm] \quad \text{[Equation 15]}$$

In case that PUCCH and PUSCH are transmitted simultaneously in subframe i on a serving cell c in a system supporting carrier aggregation, PUSCH transmission power of UE may be determined according to Equation 16.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm] \quad \text{[Equation 16]}$$

TABLE 11

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for a case of a DRX state, a UE attempts to decode a PDCCH of DCI format 0/4 using a C-RNTI of the terminal or DCI format for an SPS C-RNTI and a PDCCH of DCI format 3/3A using a TPC-PUSCH-RNTI of the terminal in each subframe. When DCI format 0/4 and DCI format 3/3A for a serving cell c are detected in the same subframe, a UE uses $\delta_{PUSCH,c}$ provided in DCI format 0/4. $\delta_{PUSCH,c}$ is 0 dB for a subframe in which a TPC command decoded for the serving cell c is absent, a DRX is generated, or a subframe having an index i is not an uplink subframe in TDD.

A value $\delta_{PUSCH,c}$ signaled on the PDCCH together with DCI format 0/4 may be given as an absolute value as shown in Table 12. $\delta_{PUSCH,c}$ is 0 dB when the PDCCH together with DCI format 0 is validated by SPS activation, or the PDCCH is released. A value $\delta_{PUSCH,c}$ signaled on the PDCCH together with DCI format 3/3A may be an accumulated value of Table 12, or may be an accumulated value of Table 13 determined by a TPC-index parameter provided in a higher layer.

TABLE 12

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 13

| TPC Command Field in DCI format 3A | Accumulated $\delta_{PUSCH,c}$ [dB] |
|---|---|
| 0 | −1 |
| 1 | 1 |

When a UE reaches a maximum transmission power $\hat{P}_{CMAX,c}(i)$ in the serving cell c, a positive TPC command is not accumulated for the serving cell c. On the other hand, when a terminal reaches a minimum maximum power, a negative TPC command is not accumulated.

Figure 13:
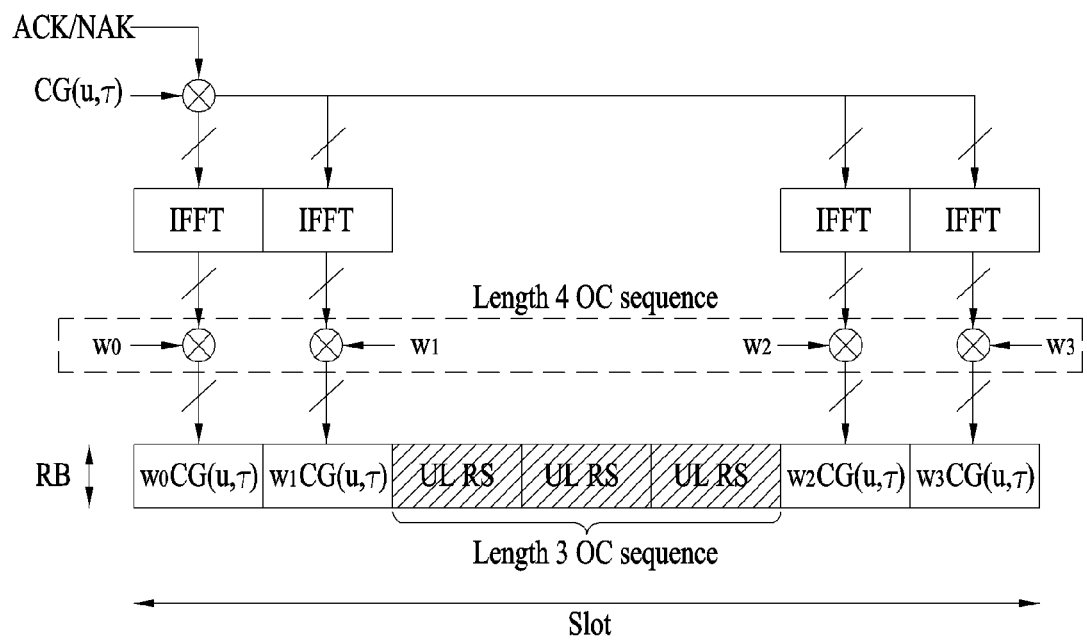
FIGS. 13 and 14 illustrates a PUCCH format 1a and 1b structure in case of normal CP.
Figure 14:
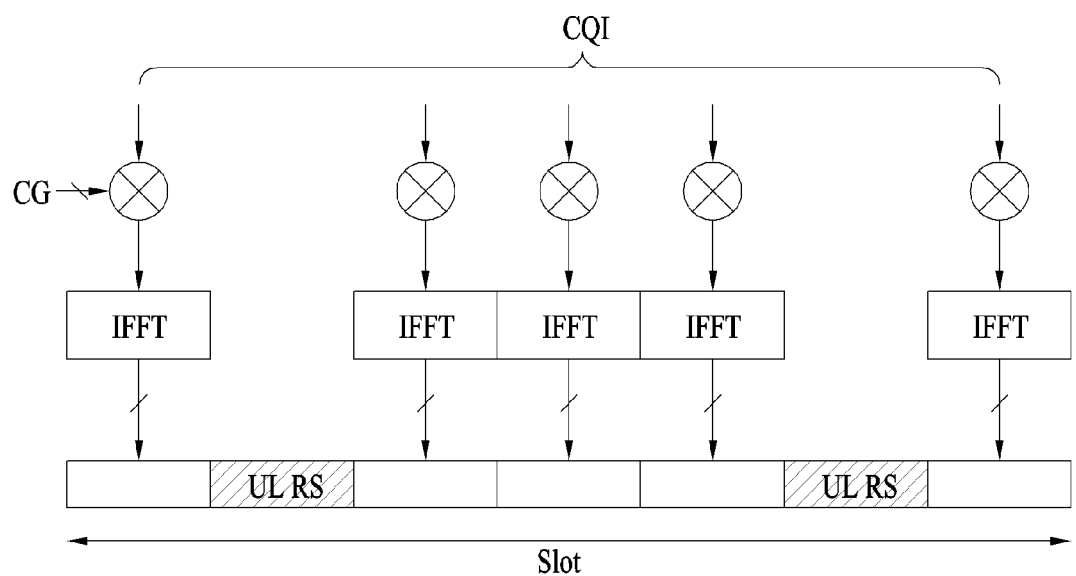

FIGS. 13 and 14 illustrate a slot level structure of a PUCCH format. PUCCH is used to transmit uplink control information and includes the following formats.

(1) Format 1: On-Off keying (OOK) modulation, used for scheduling request (SR)

(2) Format 1a/1b: used for ACK/NACK (Acknowledgement/Negative acknowledgement) transmission 1) Format 1a: BPSK ACK/NACK for one codeword
2) Format 1b: QPSK ACK/NACK for two codewords (3) Format 2: QPSK modulation, used for CQI transmission (4) Format 2a/2b: used for simultaneous transmission of CQI and ACK/NACK Table 14 shows modulation schemes according to PUCCH format and the number of bits per subframe. PUCCH format 2a/2b in Table 14 corresponds to a case of normal cyclic prefix.

TABLE 14

| PUCCH format | Uplink Control Information, UCI |
|---|---|
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1/2-bit HARQ ACK/NACK (20 bits) (Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

FIG. 13 shows a PUCCH format 1a and 1b structure in case of normal CP. In PUCCH format 1a and 1b, the same control information is repeated in each slot within a subframe. UEs transmit ACK/NACK signals through different resources each of which comprises orthogonal covers or orthogonal cover codes (OCs or OCCs) w0, w1, w2, w3 (i.e. time domain codes) and different cyclic shifts CG(u,τ) (i.e., frequency domain codes) of a Computer-Generated Constant Amplitude Zero Auto Correlation (CG-CAZAC) sequence. For example, the OCs may include Walsh/DFT orthogonal codes. When the number of CSs is 6 and the number of OCs is 3, a total of 18 UEs may be multiplexed in the same Physical Resource Block (PRB) based on a single antenna. Orthogonal sequences w0, w1, w2, w3 may be applied to an arbitrary time domain (after FFT modulation) or an arbitrary frequency domain (before FFT modulation).

For SR and persistent scheduling, ACK/NACK resources composed of CSs, OCs and Physical Resource Blocks (PRBs) may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

FIG. 14 shows a PUCCH format 2/2a/2b structure in case of normal CP. Referring to FIG. 14, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

PUCCH power control in LTE-A system is described hereinafter. A power for PUCCH transmitted in subframe i may be determined by Equation 17. In case that a serving cell c is a primary cell, a UE transmit power in subframe i, $P_{PUCCH}(i)$, is given by the following equation.

$$P_{PUCCH}(i) = \min\left\{\begin{array}{l}P_{CMAX,c}(i),\\P_{0PUCCH} + PL_c + h(\cdot) + \Delta_{FPUCCH}(F) + \Delta_{TxD}(F') + g(i)\end{array}\right\}[\text{dBm}] \quad [\text{Equation 17}]$$

$P_{CMAX,c}(i)$ represents the maximum transmission power of a UE for serving cell c. $P_{O\_PUCCH}$ is a parameter configured as a sum of $P_{O\_NOMINAL\_PUCCH}$ and $P_{O\_UE\_PUCCH}$. $P_{O\_NOMINAL\_PUCCH}$ and $P_{O\_UE\_PUCCH}$ are provided by a higher layer (e.g. RRC layer). $PL_c$ represents a downlink pathloss estimate for serving cell c. A parameter $\Delta_{F\_PUCCH}$ (F) is provided by a higher layer signaling. Each value of $\Delta_{F\_PUCCH}$(F) represents a value corresponding to a value corresponding to a corresponding PUCCH format as compared to PUCCH format 1a. If a UE is configured by a higher layer to transmit PUCCH on two antenna ports, a parameter $\Delta_{TxD}$(F') is provided by a higher layer. Otherwise, if PUCCH is transmitted on a single antenna port, $\Delta_{TxD}$(F') is 0. That is, $\Delta_{TxD}$(F') corresponds to a power compensation value in consideration of a transmission mode for antenna port.

$h(\cdot)$ is a value dependent on PUCCH format. $h(\cdot)$ is a function whose input parameter is at least one of $n_{CQI}$, $n_{HARQ}$, or $n_{SR}$. For example, in case of PUCCH format 3, $$h(\cdot) = \frac{n_{HARQ} + n_{SR} - 1}{2}.$$

In this case, $n_{CQI}$ represents a power compensation value related to channel quality information. Specifically, $n_{CQI}$ corresponds to the number of information bits for channel quality information. $n_{SR}$ represents a power compensation value related to SR. Specifically, $n_{SR}$ corresponds to the number of SR bits. In case that a configured to transmit SR subframe (briefly SR subframe) corresponds to HARQ-ACK transmission timing using PUCCH format 3, a UE transmits a joint-coded SR bit (e.g. 1 bit) and one or more HARQ-ACK bits through PUCCH format 3. Thus, in an SR subframe, the size of information bits transmitted through PUCCH format 3 is always larger by one than an HARQ-ACK payload size. Thus, $n_{SR}$ is 1 if subframe i is an SR subframe, and $n_{SR}$ is 0 in non-SR subframe.

$n_{HARQ}$ represents a power compensation value related to HARQ-ACK. Specifically, $n_{HARQ}$ corresponds to the number of (valid) information bits of HARQ-ACK. Further, $n_{HARQ}$ is defined as the number of transport blocks received in a corresponding downlink subframe. That is, power control is determined by the number of transport blocks scheduled by a base station and whose PDCCHs are successfully decoded by a UE. Meanwhile, the size of HARQ-ACK payload is determined by the number of configured DL cells. Thus, in case that a UE is configured to have one serving cell, $n_{HARQ}$ is the number of HARQ bits transmitted in subframe i. In case that a UE has a plurality of serving cells, $n_{HARQ}$ is given as follows. In case of TDD, in case that a UE receives SPS release PDCCH in one of subframe(s) i-$k_m$ ($k_m \in K$, $0 \leq m \leq M-1$) on service cell c, $n_{HARQ,c}$=(the number of transport blocks received in subframe(s) i-$k_m$)+1. In case that a UE does not receive SPS release PDCCH in one of subframe(s) i-$k_m$ ($k_m \in K:\{k_0, k_1, \ldots k_{M-1}\}$, $0 \leq m \leq M-1$) on serving cell c, $n_{HARQ,c}$=(the number of transport blocks received in subframe(s) i-$k_m$). In case of FDD, $n_{HARQ}$ is given in a similar manner as TDD, where M=1 and k0=4.

Specifically, in case of TDD, $$n_{HARQ} = \sum_{c=0}^{C-1} \sum_{k_m \subset K} N_{k_m,c}^{received},$$

where C represents the number of configured serving cells, $N_{k_m,c}^{received}$ represents the number of transport blocks and SPS release PDCCHs which were received in subframe(s) i-$k_m$ on serving cell c. In case of FDD, $$n_{HARQ} = \sum_{c=0}^{C-1} N_c^{received},$$

where $n_c^{received}$ represents the number of transport blocks and SPS release PDCCHs which were received in subframe i-4 on serving cell c.

g(i) represents an adjustment state of the current PUCCH power control. Specifically, $$g(i) = g(i-1) + \sum_{m=0}^{M-1} \delta_{PUCCH}(i - k_m).$$

g(0) is the first value after reset. $\delta_{PUCCH}$ is a UE-specific correction value, and is referred to as TPC command. $\delta_{PUCCH}$ is included in a PDCCH having DCI format 1A/1B/1D/1/2A/2/2B/2C in case of PCell. Further, $\delta_{PUCCH}$ is joint-coded with another UE-specific PUCCH correction value in a PDCCH having DCI format 3/3A. $\delta_{PUCCH}$ may be indicated through a TPC command field of DCI format, and may be given by Table 15 or 16.

TABLE 15

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 16

| TPC Command Field in DCI format 3A | $\delta_{PUCCH}$ [dB] |
|---|---|
| 0 | −1 |
| 1 | 1 |

Figure 15:
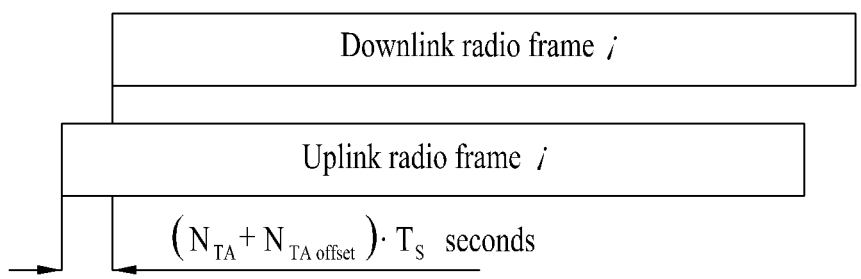
FIG. 15 illustrates an example of uplink-downlink timing relation.

FIG. 15 illustrates an example of uplink-downlink timing relation.

In the LTE system based on an orthogonal frequency division multiplex (OFDM) technology, the length of time a signal takes to reach a base station from a UE may vary according to a radius of a cell, a location of the UE in a cell, a mobility of the UE, etc. That is, unless the base station controls UL transmission timing for each UE, there is possibility of interferences between UEs during a communication between the UE and the base station, and this causes an increase of error rate in the base station. The length of time a signal takes to reach a base station from a UE may be referred to as a timing advance. Assuming that a UE may be located randomly within a cell, the timing advance from the UE to the eNB may be varied based on a location of the UE. Thus, a base station must manage or handle all data or signals transmitted by UEs within the cell in order to prevent interferences between UEs. Namely, a base station must adjust or manage a transmission timing of UEs according to each UE's circumstances, and such adjustment or management may be referred to as a maintenance of timing advance (or time alignment).

The maintenance of timing advance (or time alignment) may be performed via a random access procedure. During the random access procedure, a base station receives a random access preamble transmitted from a UE, and the base station can calculate a timing advance (Sync) value using the received random access preamble, where the timing advance value is to adjust (i.e., faster or slower) a signal transmission timing of the UE. The calculated timing advance value can be notified to the UE by a random access response, and the UE may update the signal transmission timing based on the calculated timing advance value. As an alternative, a base station may receive a sounding reference signal (SRS) transmitted from a UE periodically or randomly, the base station may calculate the timing advance (Sync) value based on the SRS, and the UE may update the signal transmission timing based on the calculated timing advance value.

As explained above, a base station may measure a timing advance of a UE via a random access preamble or SRS, and may notify an adjustment value of time alignment to the UE. Here, the value for time alignment (i.e., the adjustment value of time alignment) may be referred to as a timing advance command (TAC) or a timing advance value (or TA value).

With reference to FIG. 15, transmission of the uplink radio frame number i from a UE may start $(N_{TA}+N_{TAoffset}) \times T_s$ seconds before the start of the corresponding downlink radio frame at the UE, where $0 \leq N_{TA} \leq 20512$, $N_{TAoffset}=0$ for FDD frame structure and $N_{TAoffset}=624$ for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset}) \times T_s$. UL transmission timing may be adjusted in units of a multiple of $16T_s$. $T_s$ represents a sampling time. A timing advance command (TAC) in a random access response is 11 bits and indicates a value of 0 to 1282, and $N_{TA}$ is given as $N_{TA}=TA*16$. Alternatively, a timing advance command (TAC) is 6 bits and indicates a value of 0 to 63, and $N_{TA}$ is given as $N_{TA,old}+(TA-31)*16$. The timing advance command received in subframe n is applied starting from subframe n+6.

Figure 16:
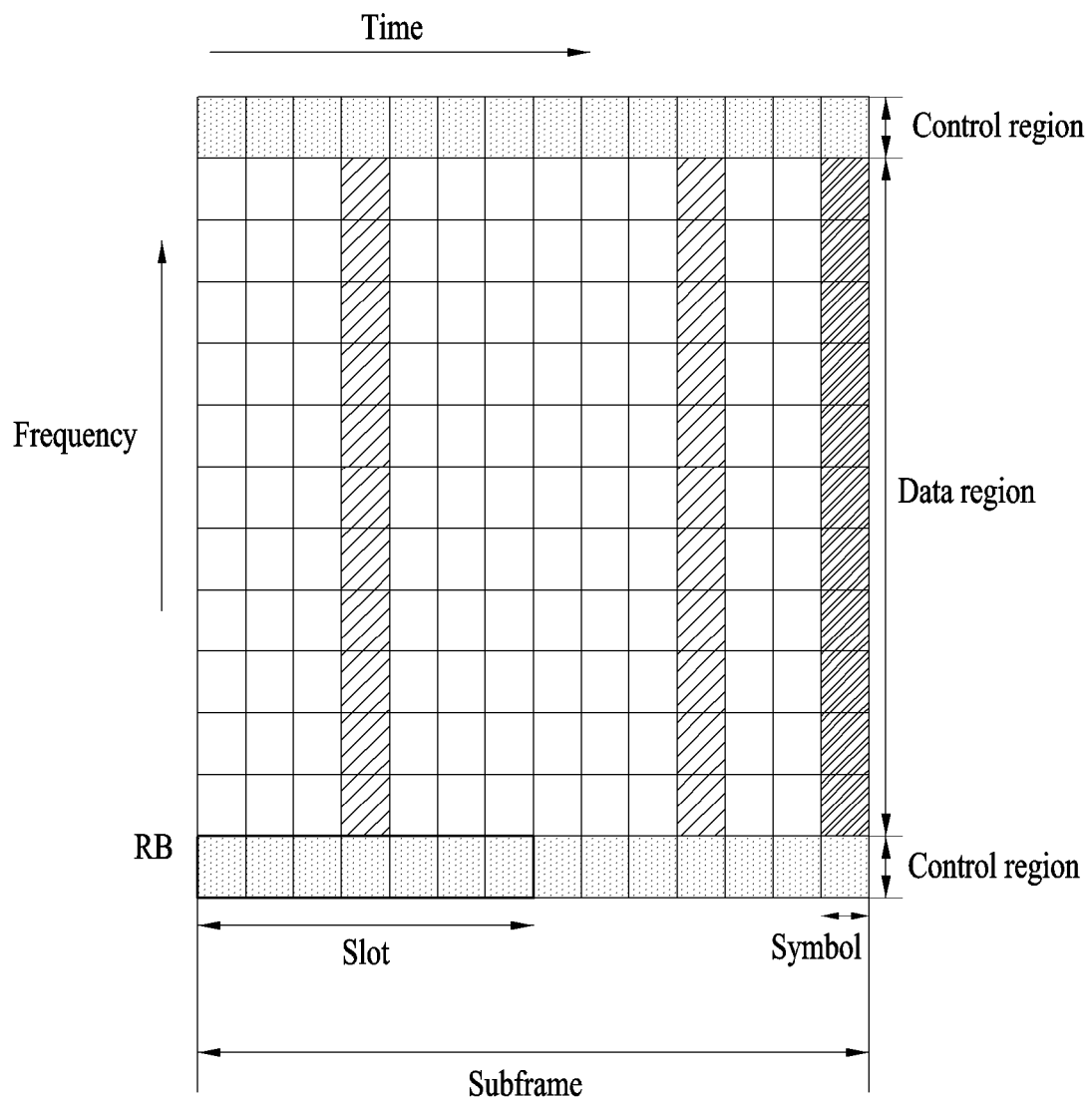
FIG. 16 illustrates a reference signal used in an uplink subframe in the LTE system.

FIG. 16 illustrates a reference signal used in an uplink subframe in the LTE system. The LTE system supports Sounding Reference Signal (SRS) and Demodulation Reference Signal (DMRS) as uplink reference signals. Demodulation reference signal may be combined with PUSCH or PUCCH transmission, and may be transmitted by a UE to a base station for demodulation of an uplink signal. Sounding reference signal may be transmitted by a UE to a base station for uplink scheduling. A base station estimates an uplink channel using the received sounding reference signal, and uses the estimated uplink channel for uplink scheduling. The same base sequence may be used for the sounding reference signal and the demodulation reference signal.

A base sequence for DMRS or SRS may hop per slot. That is, the base sequence for DMRS or SRS may be generated using a sequence selected from a specific sequence group, and different base sequences may be generated per slot by designating a sequence group number per slot. Using different sequences per slot may be referred to as a sequence group hopping or group hopping. For example, the sequence group number may be designated by Equation 18.

$$u=(f_{gh}(n_s))+f_{ss}) \bmod 30 \quad \text{[Equation 18]}$$

In Equation 18, $n_s$ represents a slot number, $f_{gh}(n_s)$ represents a group hopping pattern, $f_{ss}$ represents a sequence shift pattern. For example, there may be 17 different hopping patterns, and there may be 30 different sequence shift patterns. Group hopping may be enabled or disabled by a higher layer signaling. In case of applying group hopping, group hopping for PUSCH may be disabled for a specific UE even when group hopping is enabled for a cell. A group hopping pattern may be different for PUSCH, PUCCH, SRS. For example, a group hopping pattern may be determined according to Equation 19.

$$f_{gh}(n_s) = \begin{cases} 0 & \text{if group hopping is disabled} \\ (\sum_{i=0}^{7} c(8n_s + i) \cdot 2^i) \bmod 30 & \text{if group hopping is disabled} \end{cases} \quad \text{[Equation 19]}$$

In Equation 19, c(i) represents a pseudo random sequence and may be initialized according to $$c_{init} = \left\lfloor \frac{n_{ID}^{RS}}{30} \right\rfloor$$

at the start of each radio frame. $n_{ID}^{RS}$ represents a virtual cell ID (identity) for sequence generation, and may be determined as in the following. $\lfloor \ \rfloor$ represents a floor function.

PUSCH related transmission: $n_{ID}^{RS}$ is determined as a value designated through a higher layer, or $n_{ID}^{RS}$ is determined as $N_{ID}^{cell}$ if not designated through a higher layer or PUSCH corresponds to a random access response grant.

PUCCH related transmission: $n_{ID}^{RS}$ is determined as a value designated through a higher layer, otherwise $n_{ID}^{RS}$ is determined as $N_{ID}^{cell}$.

SRS: $n_{ID}^{RS}$ is determined as $N_{ID}^{cell}$.

A sequence shift pattern $f_{ss}$ may be determined differently for PUCCH, PUSCH, or SRS. A sequence shift pattern $f_{ss}^{PUCCH}$ for PUCCH may be defined according to $f_{ss}^{PUCCH}=n_{ID}^{RS} \bmod 30$. A sequence shift pattern $f_{ss}^{PUSCH}$ for PUSCH may be defined according to $f_{ss}^{PUSCH}=(N_{ID}^{cell}+\Delta_{ss}) \bmod 30$, where $\Delta_{ss} \in \{0, 1, \ldots, 29\}$. A sequence shift pattern $f_{ss}^{SRS}$ for SRS may be defined according to $f_{ss}^{SRS}=n_{ID}^{RS} \bmod 30$.

Referring to FIG. 16, a user equipment may periodically or non-periodically transmit an SRS (sounding reference signal) to estimate a channel for an uplink band (sub band) except a band on which PUSCH is transmitted or obtain information on a channel corresponding to a whole UL bandwidth (wide band). In case of periodically transmitting the SRS, a period may be determined via an upper layer signal. In case of non-periodically transmitting the SRS, a base station may indicate the transmission of the SRS using an 'SRS request' field of an UL-DL DCI format on PDCCH or trigger the transmission of the SRS using a triggering message. In case of a non-periodic SRS, a user equipment may transmit the SRS only when the SRS is indicated via PDCCH or a triggering message is received.

As shown in FIG. 16, a region capable of receiving an SRS in a subframe corresponds to a period at which an SC-FDMA symbol, which is located at the last of a time axis in the subframe, is situated. In case of a TDD special subframe, an SRS may be transmitted via UL period (e.g., UpPTS). In case of a subframe configuration allocating a single symbol to UL period (e.g., UpPTS) according to Table 2, an SRS may be transmitted via the last symbol. In case of a subframe configuration allocating 2 symbols, an SRS may be transmitted via the last one or two symbols. SRSs of many user equipments transmitted in the last SC-FDMA of an identical subframe may be distinguished from each other according to a frequency position.

Unlike PUSCH, DFT (discrete Fourier Transform) operation used for converting into SC-FDMA is not performed for SRS and the SRS is transmitted without using a precoding matrix which is used by PUSCH. Thus, if SRS and PUSCH are transmitted simultaneously in one subframe in a single carrier system, PUSCH is required to be rate-matched for resources except for the last symbol interval of a corresponding subframe. Rate-matching may refer to an operation adjusting a rate (or throughput) to a desired value by puncturing or repeating bits to be transmitted. Further, transmitting PUSCH except for the last symbol interval of a subframe may be referred to as a rate-matched PUSCH.

Likewise, if SRS and PUCCH are transmitted simultaneously in one subframe in a single carrier system, PUCCH is processed without the last symbol interval of a corresponding subframe. In this case, PUCCH may be composed based on Orthogonal Cover Code (OCC) having a short length corresponding to remaining symbols other than the last symbol interval carrying SRS. As such, PUCCH composed without the last symbol interval of a subframe may be referred to as a shortened PUCCH format. For example, in examples of FIGS. 13 and 14, if a shortened PUCCH format is used, w0, w1, w2 may be used for an orthogonal cover code (OCC), and uplink control information may not be transmitted in the last symbol.

Moreover, a region to which a DMRS (demodulation reference signal) is transmitted in one subframe corresponds to a period at which an SC-FDMA symbol, which is located at the center of each slot in a time axis, is situated. Similarly, the DMRS is transmitted via a data transmission band on a frequency axis. Precoding applied to demodulation reference signal in uplink multiple antenna transmission may be identical to precoding applied to PUSCH.

Table 17 shows an example of the number of RS per slot according to PUCCH format. Table 18 shows an example of SC-FDMA symbol positions of uplink demodulation reference signal (DMRS) according to PUCCH format. For instance, the DMRS is transmitted in a $4^{th}$ SC-FDMA symbol and an $11^{th}$ SC-FDMA symbol in a subframe to which a normal cyclic prefix is applied.

TABLE 17

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

TABLE 18

| PUCCH format | Normal cyclic prefix | Extended cyclic prefix |
|---|---|---|
| 1, 1a, 1b | 2, 3, 4 | 2, 3 |
| 2, 2a, 2b | 1, 5 | 3 |

Figure 17:
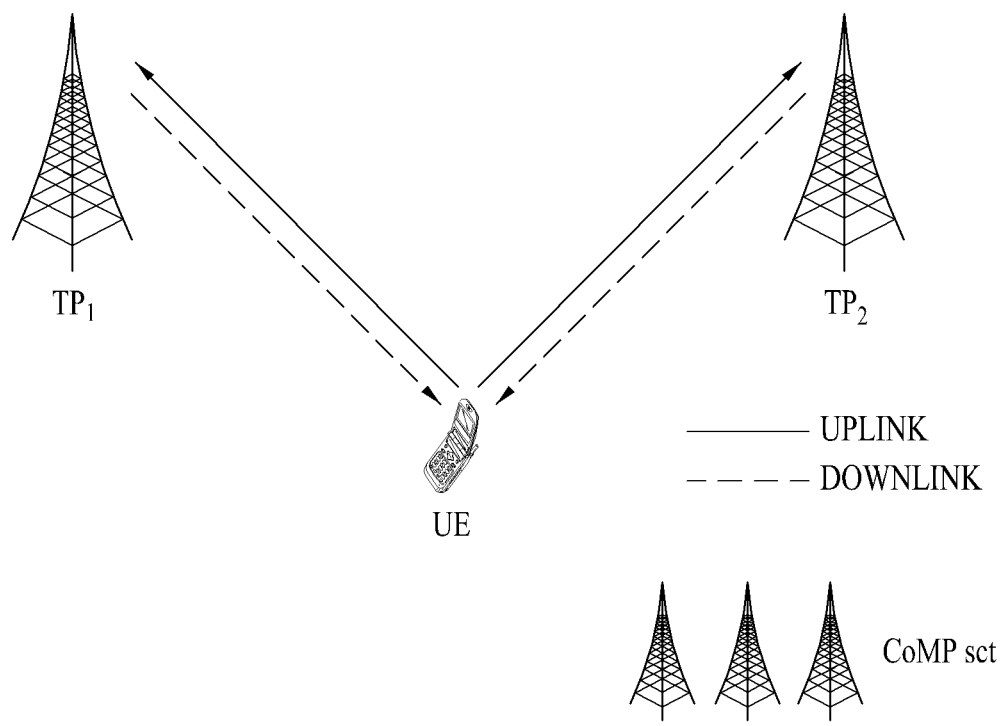
FIG. 17 illustrates an exemplary Coordinated Multi-Point (CoMP) system.

FIG. 17 illustrates an exemplary Coordinated Multi-Point (CoMP) system.

CoMP transmission schemes for DL may be classified into Joint Transmission (JT), Coordinated Scheduling/Beamforming (CS/CB), and Dynamic Cell Selection (DCS).

In JT, a plurality of points (a part or all of points (e.g., eNBs) participating in a CoMP operation) transmit DL signals (e.g., PDSCHs, PDCCHs, etc.). That is, a plurality of transmission points may transmit data to a single UE at the same time. JT may improve the quality of a received signal coherently or non-coherently and actively cancel interference with other UEs.

In DCS, one point (from among points participating in a CoMP operation) transmits a PDSCH to a UE at one time. That is, one point transmits data to a single UE at a specific time point, while the other points do not transmit data to the UE at the specific time point. A point that transmits the data to the UE may be selected dynamically.

In CS/CB, points participating in a CoMP operation may perform beamforming for data transmission to a UE through cooperation. Although only a serving point transmits data to the UE, user scheduling/beamforming may be determined through cooperation of the points participating in the CoMP operation.

On UL, CoMP reception refers to receiving a transmission signal through cooperation at a plurality of geographically spaced points. CoMP schemes for UL may be classified into Joint Reception (JR) and CS/CB.

In JR, a plurality of reception points receive a PUSCH signal from a UE, whereas in CS/CB, scheduling/beamforming is performed while only one point receives a PUSCH signal from a UE.

In such a CoMP system, a UE may receive data commonly from multi-cell BSs. Further, since the BSs simultaneously support one or more UEs using the same radio frequency resources, system performance can be improved. The BSs may also implement Space Division Multiple Access (SDMA) based on channel state information between the BSs and the UE.

A serving BS and one or more cooperative BSs may be connected to a scheduler through a backbone network in the CoMP system. The scheduler may operate based on channel information about the channel state between each UE and a cooperative BS, measured by the cooperative BS and received from the cooperative BS through the backbone network. For example, the scheduler may schedule information for a cooperative MIMO operation, for the serving BS and one or more cooperative BSs. That is, the scheduler may directly transmit an instruction for the cooperative MIMO operation to each BS.

As described above, the CoMP system may operate as a virtual MIMO system by grouping a plurality of transmission points into one group. Basically, a MIMO communication scheme based on multiple antennas may be applied to the CoMP system. A group of transmission points may be referred to as a CoMP set. Because transmission points are located in different areas in the CoMP system, different cell coverage may be provided. This CoMP system may be referred to as an inter-site CoMP system.

Referring to FIG. 17, an inter-site CoMP system including two Transmission Points (TPs) is illustrated, by way of example. To implement a CoMP scheme in 3GPP LTE Rel-11, Transmission Mode 10 (TM10) may be configured for a UE. The UE may transmit and receive signals to and from TPs (e.g., TP1 and TP2) of a CoMP set. The UE may transmit channel state information about the TPs of the CoMP set. In this case, the TPs of the CoMP set may transmit RSs to the UE. If channel estimation characteristics of different antenna ports of the different TPs can be shared, the load and complexity of reception processing at the UE may be reduced. Also, if channel estimation characteristics of different antenna ports of the same TP can be shared among the antenna ports, the load and complexity of reception processing at the UE may be reduced. At present, a method for sharing channel estimation characteristics among antenna ports is proposed for the current LTE(-A) system.

For channel estimation between antenna ports, the LTE(-A) system has introduced the concept of Quasi Co-Located (QCL). For example, given two antenna ports, if the large-scale properties of a radio channel carrying a symbol transmitted through one antenna port can be inferred from a radio channel carrying a symbol transmitted through the other antenna port, it may be said that the two antenna ports are QCL. The large-scale properties of a radio channel includes one or more of a delay spread, a Doppler spread, a Doppler shift, an average gain, and an average delay. For the convenience of description, quasi co-located will be abbreviated as QCL.

For example, if two antenna ports are said to be QCL, the large-scale properties of a radio channel from one antenna port is identical to those of a radio channel from the other antenna port. In the case where RSs are transmitted through a plurality of antenna ports, if the antenna ports transmitting the two different types of RSs are QCL, the large-scale properties of a radio channel from one antenna port may be replaced with those of a radio channel from the other antenna port.

According to the above-described concept of QCL, a UE may not assume the same large-scale properties between radio channels from non-QCL antenna ports. In this case, the UE should perform timing acquisition and tracking, frequency offset estimation and compensation, delay estimation, and Doppler estimation, independently for each of the non-QCL antenna ports.

The UE may advantageously perform the following operations for antenna ports that can be assumed to be QCL.

In regard to delay spreads and Doppler spreads, the UE may apply the results of estimating the power delay profile, delay spread and Doppler spectrum, and Doppler spread of a radio channel from one antenna port to a Wiener filter or the like during channel estimation of a radio channel from another antenna port.

In regard to frequency shifts and reception timings, after the UE acquires time and frequency synchronization for one antenna port, the UE may apply the same synchronization to demodulation of another antenna port.

In regard to an average reception power, the UE may average Reference Signal Received Power (RSRP) measurements for two or more antenna ports.

UEs for which TM8, TM9, and TM10 are configured may assume that antenna ports 7 to 14 are QCL. UEs for which TM1 to TM9 are configured may assume that antenna ports 0 to 3, 5, and 7 to 22 are QCL. A UE for which TM10 is configured may be set to one QCL type indicated by higher-layer signaling. For QCL type A, the UE may assume that antenna ports 0 to 3 and antenna ports 7 to 22 are QCL. For QCL type B, a BS may indicate CSI-RS resources to be QCL with an antenna port for a PDSCH by higher-layer signaling (e.g., RRC signaling) and the UE may assume that antenna ports 15 to 22 corresponding to a CSI-RS resource configuration indicated by higher-layer signaling (e.g., RRC signaling) and antenna ports 7 to 14 related to the PDSCH are QCL.

Upon receipt of a specific DMRS-based DL DCI format on a control channel (PDCCH or EPDCCH), a UE demodulates data after performing channel estimation on a PDSCH using a DMRS sequence. For example, if the UE can assume that antenna ports that transmit DMRSs received along with a DL scheduling grant are QCL with antenna ports that transmit CRSs of its DL serving cell or other cells, the UE may apply the large-scale properties of radio channels estimated from the CRS ports during channel estimation through the DMRS ports, thereby increasing the performance of a processor at a DMRS-based receiver. Accordingly, the assumption of QCL between antenna ports may be used in reception of various DL RSs, channel estimation, channel state reporting, etc.

A new TM, TM10 has been introduced to support a CoMP operation between a plurality of cells or TPs in a system beyond LTE-A Rel-11. Thus, a UE for which TM10 is configured may perform DPS-based data detection/reception. For example, after a BS presets a plurality of parameter sets related to TM10 by higher-layer signaling (e.g., RRC signaling), the BS may transmit information indicating a specific parameter set from among the plurality of parameter sets to the UE in a specific field of a DL grant. The UE may perform a data reception operation corresponding to the DL grant based on the parameter set indicated by the specific field of the DL grant. The information indicating the specific parameter set from among the plurality of parameter sets related to TM10 is referred to as a PDSCH RE mapping and Quasi-co-location Indicator (PQI). For the convenience of description, a parameter set related to TM10 may also be referred to as the PQI. A plurality of parameter sets are grouped into one parameter set group, which may be referred to as a PQI set. Therefore, one parameter set group (or one PQI group) may include a plurality of parameter sets (or PQIs) and one parameter set (or one PQI) may include a plurality of parameters required for data reception.

Table 19 illustrates an exemplary mapping relationship between a plurality of parameter sets related to TM10 and PQI values. Table 19 is a mere example and thus the mapping relationship between the numbers of parameter sets and the PQI values may vary.

TABLE 19

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

A PQI (or parameter set) may provide QCL information indicating whether signals (e.g., RSs)/channels (cells/points transmitting them) are identical/similar in terms of geographical/physical locations, along with data RE mapping information (including information from which the data RE mapping information may be inferred) indicating REs carrying actual data. The data RE mapping information may include information about REs excluded from data reception and/or REs used for a usage (e.g., RSs) other than data. The QCL information may include information about signals/channels (cells transmitting the signals/channels) that the UE is supposed to assume to be QCL. One or more PQIs may correspond to one cell/TP (hereinafter, generically referred to as a cell). A PQI (or parameter set) may be configured to include the following parameters. Each parameter may be referred to as a PQI element.

PQI element 1: information about the number of CRS antenna ports. For example, the number of CRS antenna ports may be the number of antenna ports used for CRS transmission, described before with reference to FIG. 6.

PQI element 2: information about a CRS frequency shift. For example, it may indicate $v_{shift}$ described in relation to Equation 6.

PQI element 3: information about an MBSFN subframe configuration. For example, it may indicate the aforedescribed MBSFN subframe configuration which may include an allocation period of a radio frame including an MBSFN subframe, an allocation offset specifying the starting position of the radio frame including the MBSFN subframe, or a subframe allocated as an MBSFN subframe in one or more radio frames from a radio frame indicated by the allocation period and the allocation offset.

PQI element 4: information about a zero-power CSI-RS resource configuration. For example, a zero-power resource configuration may include a CSI-RS resource configuration (e.g., refer to Table 8 and Table 9) and a zero-power CSI-RS configuration list. The zero-power CSI-RS configuration list may be, for example, a 16-bit bitmap.

PQI element 5: information about a PDSCH starting position. For example, the PDSCH starting position may indicate the starting OFDM symbol of a PDSCH.

PQI element 6: information about a CSI-RS resource configuration IDentity (ID).

The LTE-A system (Rel-11) has introduced a UE-specific DMRS-based EPDCCH for the purpose of improving the performance and efficiency of control channels. The EPDCCH may be designed so as to be transmitted across an entire PRB pair (including a legacy PDSCH region) along the time axis. More specifically, a Search Space (SS) for EPDCCH detection may include one or more (e.g., two) EPDCCH sets, each occupying a plurality of (e.g., 2, 4, or 8) PRB pairs. The Enhanced CCEs (ECCEs) of each EPDCCH set may be mapped in a localized or distributed manner (depending on whether one ECCE is distributed across a plurality of PRB pairs).

Meanwhile, a plurality of cells having small coverage may be deployed co-existent in a system beyond LTE-A. These cells may be clustered in a limited area such as a hot spot or an indoor place. The cells of a cluster should be able to basically perform a CoMP operation, for cooperative communication among them. Meanwhile, a very large number of cells may be dynamically deployed. If these cells are deployed/managed in the form of a plurality of Remote Radio Heads (RRHs) under a single eNB, a (cost/time) limitation/constraint may be imposed. Therefore, such a large number of cells are likely to be managed/operated by different eNBs, which may be efficient. Even in this case, the different eNBs may need to perform a CoMP (e.g., inter-site CoMP) operation.

In the inter-site CoMP situation, eNBs may be interconnected through a non-ideal backhaul, resulting in a very large signaling latency accompanying exchange of scheduling information between the eNBs. Accordingly, to avert this problem, a method for using data scheduling SSs separately between eNBs (in time/frequency) may be considered. Also, since each eNB manages/operates a different cell, a different PQI for the CoMP operation may need to be set for the eNB. Thus, a PQI needs to be set for an SS allocated to each eNB. Despite a single eNB-based intra-site CoMP operation, more cells (than legacy ones) may need to participate in the CoMP operation, considering UE mobility in a small cell coverage environment.

In this context, the present invention proposes that a PQI set is configured independently for an SS allocated/used to/by each eNB. For the convenience of description, the SS allocated/used to/by each eNB may be referred to as a partial SS. For example, the partial SS may be a specific PDCCH/EPDCCH candidate group, a specific subframe group, or a combination of them (e.g., a specific PDCCH/EPDCCH candidate group within a specific subframe group). Also, in the case of the EPDCCH, each EPDCCH set may be one partial SS (or PDCCH/EPDCCH candidate group). For example, each of a PDCCH detection SS and an EPDCCH detection SS (or each of a PDCCH monitoring subframe and an EPDCCH monitoring subframe) may include one or more partial SSs (or PDCCH/EPDCCH candidate groups or subframe groups). For example, each of a Cell-specific SS or Common SS (CSS) and a UE-specific SS (USS) may be one or more partial SSs (or (E)PDCCH candidate groups or subframe groups).

Information configured for each partial SS is not limited to the afore-described PQI set and PQI elements. From the perspective of carrier aggregation, all or part of TM10-related parameters configurable for one carrier may be set on a partial SS basis. For example, the information configured for each partial SS may include at least one of the foregoing PQI elements (PQI element 1 to PQI element 6) and the following elements.

PQI element 7: information about a scrambling ID for generating a UE-specific DMRS (for PDSCH decoding). For example, a scrambling ID for generation of DL DMRSs may indicate $n_{SCID}$ of Equation 11.

PQI element 8: non-zero power CSI-RS resource information. In the case of QCL type B, a cell ID corresponding to a CRS placed in a QCL relationship with a CSI-RS, the number of antenna ports, an MBSFN subframe configuration, etc. may further be included.

PQI element 9: zero-power CSI-RS resource information.

PQI element 10: CSI Interference Measurement (CSI-IM) resource information. A UE for which TM10 is configured may be configured to have one or more CSI-IM resource configurations. For each CSI-IM resource configuration, a zero-power CSI-RS configuration (e.g., refer to Table 8 and Table 9) and a zero-power CSI-RS subframe configuration $I_{CSI-RS}$ (e.g., refer to Table 10) may be configured.

PQI element 11: information about antenna ports QCL (corresponding to a PDSCH). For example, it may be information indicating QCL type A or QCL type B.

Figure 18:
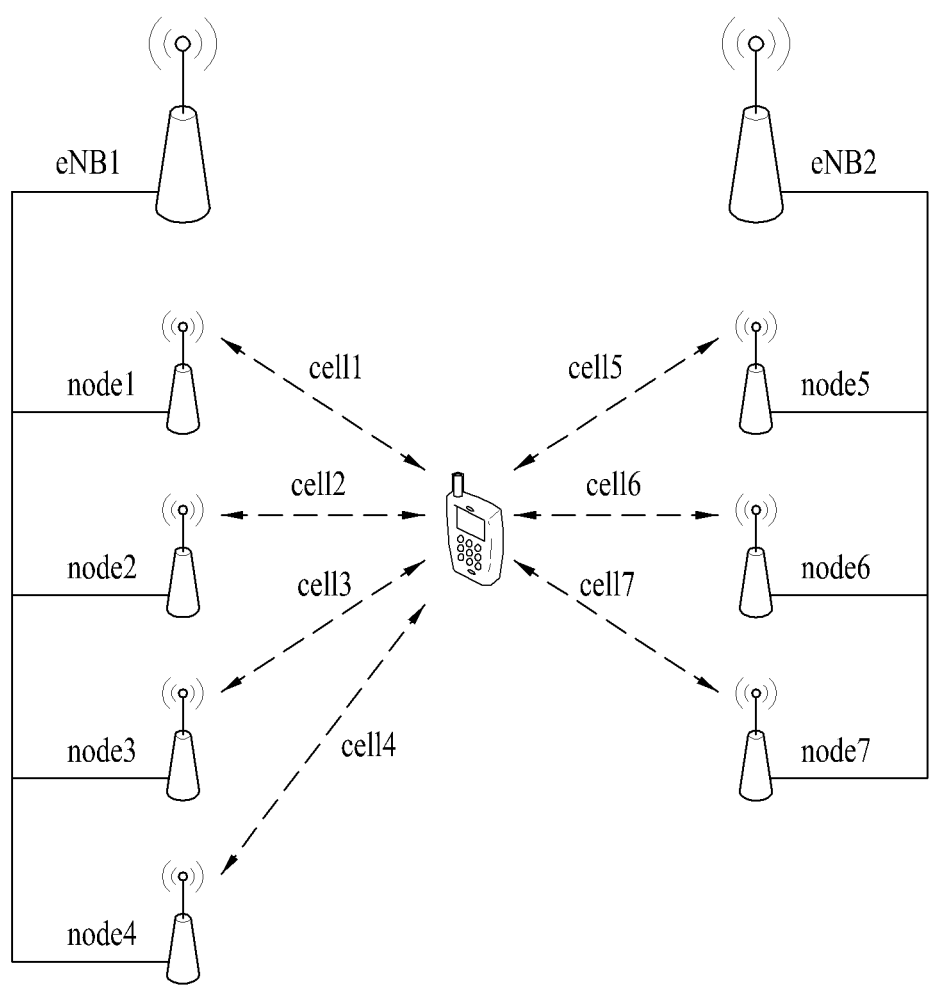
FIG. 18 illustrates exemplary inter-site CoMP communication according to the present invention.

FIG. 18 illustrates exemplary inter-site CoMP communication according to the present invention. In the example of FIG. 18, eNB1 may be connected to node1, node2, node3, and node4 through an ideal backhaul network. eNB2 may be connected to node5, node6, and node7 through an ideal backhaul network. The nodes may be, for example, RRHs, forming cell1 to cell7. Each cell may use the same carrier frequency. eNB1 and eNB2 may be connected wiredly or wirelessly through a non-ideal network. eNB1 may manage/operate cell1 to cell4 and eNB2 may manage/operate cell5, cell6, and cell7.

In the exemplary inter-site CoMP of FIG. 18, a first PQI set (PQI set 1) corresponding to scheduling targets of eNB1, cell1 to cell4 may be configured independently for a first partial SS (partial SS 1), whereas a second PQI set (PQI set 2) corresponding to scheduling targets of eNB2, cell5, cell6, and cell7 may be configured independently for a second partial SS (partial SS 2). PQI set 1 may be configured directly by eNB1 or by one node (one of node1 to node4) connected to eNB1. PQI set 2 may be configured directly by eNB2 or by one node (one of node5, node6, and node7) connected to eNB2. Then if a UE is scheduled from partial SS1, the UE may regard a value indicated by a PQI field of a DL grant as a specific PQI corresponding to the value in PQI set 1. If the UE is scheduled from partial SS2, the UE may regard a value indicated by a PQI field of a DL grant as a specific PQI corresponding to the value in PQI set 2. In this manner, the UE may perform a data reception operation corresponding to a DL grant based on a detected PQI.

FIG. 18 is an example that does not limit the present invention. Thus, the present invention may be implemented in the same manner even though the number of eNBs and the number of nodes managed/operated by each eNB are changed.

Figure 19:
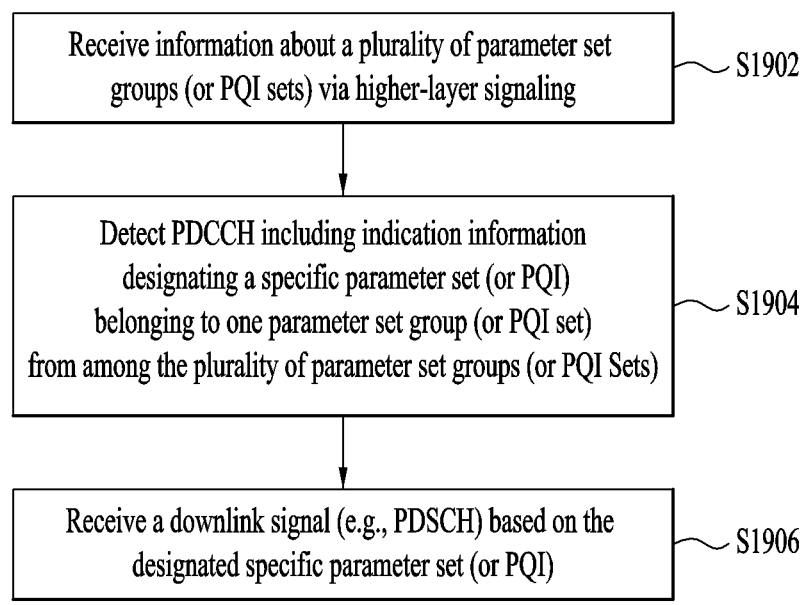
FIG. 19 is a flowchart illustrating a method for receiving a DL signal according to the present invention.

FIG. 19 is a flowchart illustrating a method for receiving a DL signal according to the present invention.

Referring to FIG. 19, a UE may receive information about a plurality of parameter set groups (or PQI sets) by higher-layer signaling (e.g., RRC signaling) in step S1902. For example, if there are N partial SSs, the received information may include N parameter set groups (or PQI sets) and each parameter set group (or PQI set) may be configured independently on a partial SS basis. Each parameter set group (or PQI set) may include a plurality of parameter sets (or PQIs). Each parameter set (or PQI) may include information about PDSCH RE mapping and information about QCL between antenna ports, specifically at least one of PQI element 1 to PQI element 11.

In step S1904, the UE may detect a PDCCH including indication information indicating a specific parameter set (or PQI) in one of a plurality of parameter set groups (or PQI sets). As described before, although the indication information may be received in a PQI field of a DL grant included in the detected PDCCH, a specific existing field may be used for PQI signaling. Further, a parameter set group (or a PQI set) to which the specific parameter set (or PQI) indicated by the indication information belongs may be determined according to an SS in which the PDCCH is detected.

For example, if the partial SS includes a specific subframe group, the parameter set group (or PQI set) to which the specific parameter set (or PQI) belongs may be determined according to a subframe in which the PDCCH is detected. For example, if there are two partial SSs, a first PQI set and a second PQI set may be configured and a first subframe group corresponding to the first PQI set and a second subframe group corresponding to the second PQI set may be specified. In this situation, if a UE receives indication information on a PDCCH (e.g., a PQI field of a DL grant), the UE may determine a PQI based on the mapping relationship between the indication information and PQIs (e.g., Table 19) but may not determine whether the PQI belongs to the first or second PQI set. According to the present invention, if a subframe carrying the indication information belongs to the first subframe group, the UE may determine a PQI in the first PQI set based on the mapping relationship. If the subframe carrying the indication information belongs to the second subframe group, the UE may determine a PQI in the second PQI set based on the mapping relationship. The present invention may be applied in the same manner to a case where there are three or more partial SSs and three or more PQI sets. The subframe groups may be configured semi-statically by higher-layer signaling (e.g., RRC signaling) or dynamically by a PDCCH (or a DL grant).

In another example, a partial SS may include a PDCCH candidate group. In this case, the parameter set group (or PQI set) to which the specific parameter set (or PQI) belongs may be determined according to a PDCCH candidate group from which the PDCCH is detected.

In another example, a partial SS may include a USS and a CSS. In this case, the parameter set group (or PQI set) to which the specific parameter set (or PQI) belongs may be determined depending on whether the PDCCH is detected from the USS or the CSS.

In step S1906, the UE may receive a DL (data) signal based on the indicated specific parameter set (or PQI).

In addition, the present invention proposes that a method similar to a PQI being an indicator of DL data transmission-related parameters/information is applied to UL. After a BS presets a plurality of UL data transmission-related parameter/information sets by higher-layer signaling (e.g., RRC signaling), the BS may transmit indication information indicating a specific parameter/information set to a UE by a specific field of a UL grant. For example, each UL data transmission-related parameter/information set may include a UL Power Control (PC) parameter and/or a Timing Advance (TA) value. For the convenience of description, a UL data transmission-related parameter/information set or indication information may be referred to as a UL Power control and Timing advance Indicator (UPTI) in the present invention. A new UPTI field added to a legacy DCI format or a legacy field may be used as a specific field for a UPTI in a UL grant. The UE may perform a UL data transmission operation corresponding to a UL grant based on a specific UPTI indicated by a UPTI field of a UL grant from among a plurality of preset UPTIs. In this case, the UE may perform the UL data transmission operation by applying a PC parameter and/or a TA value of the UPTI.

For UL, a UPTI set may be configured independently on a partial SS basis, like a PQI. A UPTI set refers to a parameter/information set group including one or more UL data transmission-related parameter/information sets. One or more UPTIs may correspond to one cell and the following parameters may be configured for each UPTI. Parameters included in a UPTI may be referred to as UPTI elements.

UPTI element 1: open-loop PC parameter information applied to PUSCH transmission and/or information about mapping between a TPC command and a TPC value in DCI. For example, open-loop PC parameters applied to the PUSCH transmission may include parameters related to $P_{O\_PUSCH,c}(j)$ and/or $\alpha_c(j)$ (e.g., refer to Equation 15 and Equation 16). For example, the mapping information between a TPC command (e.g., a TPC command field) and a TPC value (e.g., $\delta_{PUSCH,c}$ may include Table 12 or Table 13.

UPTI element 2: a TA value applied to PUSCH transmission. For example, the TA value may indicate $N_{TA}$ received in a TAC (refer to FIG. 15).

UPTI element 3: (virtual) cell ID information for generation of a DMRS sequence for PUSCH transmission. For example, a virtual cell ID for generation of a DMRS sequence for PUSCH transmission may indicate $n_{ID}^{RS}$ (see Equation 19).

UPTI element 4: SRS transmission information for determining whether to apply rate matching to a PUSCH. For example, the SRS transmission information may include information about a cell-specific SRS subframe and/or bandwidth.

FIG. 20 is an exemplary flowchart illustrating a UL signal transmission method according to the present invention.

Referring to FIG. 20, a UE may receive information about at least one parameter set group (or UPTI set) by higher-layer signaling (e.g., RRC signaling) in step S2002. One parameter set group (or UPTI set) may include a plurality of parameter sets (or UPTIs). For example, each parameter set (or UPTI) may include PC parameter information and TA information for transmission of a UL data signal (e.g., a PUSCH), specifically UPTI element 1 to UPTI element 4.

If there are a plurality of partial SSs, as many parameter set groups (or UPTI sets) as the number of the partial SSs may exist. For example, if there are N partial SSs, received information may include N parameter set groups (or UPTI sets). In this case, each parameter set group (or UPTI set) may be configured independently for each partial SS for PDCCH detection.

In step S2004, the UE may detect a PDCCH carrying indication information indicating a specific parameter set (or UPTI) belonging to one of the plurality of parameter set groups (or UPTI sets). As described before, the indication information may be received in a UPTI field of a DL grant included in the detected PDCCH or in one of legacy fields. If there are a plurality of partial SSs (or if a plurality of parameter set groups (or UPTI sets) are configured), a parameter set group (or UPTI set) to which the specific parameter set (or UPTI) indicated by the indication information belongs may be determined according to a partial SS in which the PDCCH is detected.

For example, if a partial SS includes a specific subframe group, the parameter set group (or UPTI set) to which the specific parameter set (or UPTI) belongs may be determined according to a subframe in which the PDCCH is detected. For example, if there are two partial SSs, a first UPTI set and a second UPTI set may be configured and a first subframe group corresponding to the first UPTI set and a second subframe group corresponding to the second UPTI set may be specified. In this situation, upon receipt of indication information on a PDCCH (e.g., a UPTI field of a UL grant or a legacy field), the UE may determine a UPTI based on the mapping relationship between indication information and a UPTI (e.g., a relationship similar to Table 19). However, the UE may not determine whether the UPTI belongs to the first UPTI set or the second UPTI set. According to the present invention, if a subframe carrying the indication information belongs to the first subframe group, the UE may determine a UPTI in the first UPTI set based on the mapping relationship. If the subframe carrying the indication information belongs to the second subframe group, the UE may determine a UPTI in the second UPTI set based on the mapping relationship. The present invention is also applicable in the same manner to a case where there are three or more partial SSs and three or more UPTI sets. Meanwhile, the subframe groups may be configured semi-statically by higher-layer signaling (e.g., RRC signaling) or dynamically by a PDCCH (or a UL grant).

In another example, a partial SS may include a PDCCH candidate groups. In this case, the parameter set group (or UPTI set) to which the specific parameter set (or UPTI) belongs may be determined according to a PDCCH candidate group in which the PDCCH is detected.

In another example, a partial SS may include a USS and a CSS. In this case, the parameter set group (or UPTI set) to which the specific parameter set (or UPTI) belongs may be determined depending on whether the PDCCH is detected in the USS or the CSS.

In step S2006, the UE may transmit a UL data signal (e.g., a PUSCH) based on the indicated specific parameter set (or UPTI).

In embodiments of the present invention, TCP commands/values may be accumulated independently on a UPTI basis or on a UPTI index basis. That is, only TPC commands/values corresponding to the same UPTI or UPTI index may be accumulated. In other words, TPC commands/values corresponding to different UPTIs or UPTI indexes may not be accumulated together. For example, TPC commands/values corresponding to a first UPTI index (UPTI-index 1) may be accumulated together and TPC commands/values corresponding to a second UPTI index (UPTI-index 2) may be accumulated together. That is, if a UPTI field of a UL grant indicates the first UPTI index, a TPC command/value included in the UL grant may be accumulated to a TPC command/value corresponding to the first UPTI index. If the UPTI field of the UL grant indicates the second UPTI index, the TPC command/value included in the UL grant may be accumulated to a TPC command/value corresponding to the second UPTI index. The TPC command/value corresponding to the first UPTI index (UPTI-index 1) may not be accumulated with the TPC command/value corresponding to the second UPTI index (UPTI-index 2).

In embodiments of the present invention, a TPC command/value received in UE-group common DCI (e.g., DCI format 3/3A) other than UL grant DCI may be accumulated with respect to all UPTIs or all UPTI indexes, or with respect to a UPTI having a specific index (e.g., a smallest index) among a plurality of UPTIs (automatically). Or a UPTI or UPTI index for which the TPC command/value is to be accumulated may be indicated by higher layer signaling (e.g., RRC signaling).

A UPTI may further include independent PHICH transmission information corresponding to reception of a PUSCH transmitted based on the UPTI. For example, the PHICH transmission information may include parameters from which the position/period of PHICH transmission resources (e.g., REs) may be determined/inferred. For example, the PHICH transmission information may specify the number of CRS antenna ports, a CRS frequency shift, and PHICH configuration information (e.g., PHICH-config). The PHICH configuration information may include PHICH duration information and PHICH resource information (e.g., $N_g$ in Equation 2) for each of a normal CP and an extended CP.

Or independently of a UPTI, an eNB may preset PHICH transmission information by higher-layer signaling (e.g., RRC signaling) and a UE may perform a PHICH reception information for a PUSCH (corresponding to a UL grant) based on specific PHICH transmission information indicated by the UL grant.

In addition, the PHICH transmission information may include PHICH resource index information. A PHICH resource index may indicate, for example, an index pair $(n_{PHICH}^{group}, n_{PHICH}^{seq})$ (refer to Equation 1). For example, the eNB may preset a plurality of PHICH resource indexes and indicate a specific PHICH resource index in a specific field of a UL grant. In this case, the UE may receive a PHICH in PHICH resources indicated by the specific field of the UL grant without the need for determining the PHICH resource index in PUSCH transmission resources as described in Equation 1.

Similarly to configuring PHICH transmission information in relation to a UPTI, independent HARQ-ACK feedback PUCCH transmission information corresponding to reception of a PDSCH transmitted based on a PQI may further be included on a PQI basis. The corresponding information may include the following parameters.

Open-loop PC parameter information applied to PUCCH transmission and/or mapping information between a TPC command of DCI and a TPC value and/or information about the presence or absence of a PUCCH transmission configuration (based on Transmit Diversity (TxD)) using a plurality of antennas. For example, the open-loop PC parameter information applied to PUCCH transmission may include $P_{O\_PUCCH}$, $\Delta_{F\_PUCCH}(F)$, $\Delta_{TxD}(F')$-related information (refer to Equation 17). For example, the mapping information between a TPC command (e.g., a TPC command field) and a TPC value (e.g., $\delta_{PUCCH}$) may include Table 15 or Table 16.

A TA value applied to PUCCH transmission. For example, the TA value may indicate $N_{TA}$ received in a TAC (refer to FIG. 15).

(Virtual) cell ID information for generation of a DMRS sequence for PUCCH transmission. For example, a virtual cell ID for generation of a DMRS sequence for PUCCH transmission may indicate $n_{ID}^{RS}$ (refer to Equation 19).

SRS transmission information for determining whether to apply a shortened PUCCH format. For example, the SRS transmission information may include information about a cell-specific SRS subframe and/or bandwidth.

Or the PUCCH transmission information may be configured independently of a PQI. For example, an eNB may preset PUCCH transmission information by higher-layer signaling (e.g., RRC signaling) and indicate specific PUCCH transmission information by a DL grant. Then a UE may perform a PUCCH transmission operation including an HARQ-ACK for a PDSCH (corresponding to the DL grant) based on the indicated specific PUCCH transmission information. In the present disclosure, PUCCH transmission information may be referred to as a PUCCH Information Indicator (PII).

The PUCCH transmission information may further include PUCCH resource information. The PUCCH resource information may include, for example, a Cyclic Shift (CS) value for PUCCH generation, an Orthogonal Cover (OC) or Orthogonal Cover Code (OCC), and ACK/NACK resource information specifying Physical Resource Blocks (PRBs). In an example of the present invention, after the eNB presets PUCCH resource information, the eNB may indicate specific PUCCH resource information by a specific field of a DL grant. In this case, the UE may transmit a PUCCH according to the PUCCH resource information indicated by the specific field of the DL grant. In this case, the ACK/NACK resources may not need to be given implicitly using the lowest CCE index of the PDCCH.

In embodiments of the present invention, TPC commands/values may be accumulated on a PQI (or PI) index basis. That is, only TPC commands/values corresponding to the same PQI (or PII) index may be accumulated together. In other words, TPC commands/value corresponding to different PQI (or PII) indexes may not be accumulated together. For example, TPC commands/values corresponding to a first PQI (or PII) index may be accumulated separately, whereas TPC commands/values corresponding to a second PQI (or PII) index may be accumulated separately. That is, if the PQI (or PII) field of a DL grant indicates the first PQI (or PII) index, a TPC command/value included in the DL grant may be accumulated with a TPC command/value corresponding to the first PQI (or PII) index. If the PQI (or PII) field of the DL grant indicates the second PQI (or PII) index, the TPC command/value included in the DL grant may be accumulated with a TPC command/value corresponding to the second PQI (or PII) index. Herein, the TPC command/value corresponding to the first PQI (or PII) index may not be accumulated with the TPC command/value corresponding to the second PQI (or PII) index.

In embodiments of the present invention, a TPC command/value received in UE-group common DCI (e.g., DCI format 3/3A) other than DL grant DCI may be accumulated with respect to all PQIs (or PIIs) or with respect to a PQI (or PII) having a specific index (e.g., a smallest index) (automatically). Or a PQI (or PII) index for which the TPC command/value is to be accumulated may be configured by higher-layer signaling (e.g., RRC signaling).

In a 3GPP LTE(-A) system (e.g., Release-8, 9, or 10), a CRS and a control channel such as a PCFICH/PDCCH/PHICH may be transmitted in every DL subframe of any carrier, except a DL subframe configured for a special purpose (e.g., as an MBSFN subframe). The CRS may be allocated across OFDM symbols of a subframe and the control channel such as a PCFICH/PDCCH/PHICH may be allocated to some starting OFDM symbols of a subframe in time. The CRS and the control channels may ensure backward compatibility for legacy UEs in terms of connection and service provisioning. However, it may be difficult to overcome inter-cell interference, improve carrier extension, and provide advanced features, while maintaining backward compatibility with the legacy LTE system. Accordingly, introduction of a new carrier, subframe, or TM structure that supports none or a part of the afore-described backward compatible signals/channels may be considered in order to provide various advanced features compared to the legacy LTE system, in a next-release system. A carrier type that is not compatible with the legacy LTE system may be referred to as a New Carrier Type (NCT), and a carrier compatible with the legacy LTE(-A) system may be referred to as a Legacy Carrier Type (LCT).

In embodiments of the present invention, each PQI may further include information indicating whether a common channel (e.g., a PBCH) and/or a common signal (e.g., a Primary Synchronization Signal (PSS) or a Secondary Synchronization Signal (SSS)) is transmitted or not (or rate matching is applied to the common channel/signal), in consideration of a PDSCH scheduling/reception operation in the new carrier, subframe, or TM structure which is not backward compatible (e.g., in which CRSs are not transmitted successively in all DL subframes).

Or independently of a PQI, an eNB may preset common channel/signal information by higher-layer signaling (e.g., RRC signaling) and a UE may perform a PDSCH reception operation corresponding to a DL grant based on specific common channel/signal information indicated by the DL grant (among the preset information).

Meanwhile, a method for configuring a PQI for detection/reception of a control channel separately from a PQI set configured for data reception may be considered. For the convenience of description, the PQI for detection/reception of a control channel may be referred to as a control-PQI. For example, the eNB may preset a plurality of control-PQIs by higher-layer signaling (e.g., RRC signaling) and then transmit a parameter indicating a specific control-PQI from among the plurality of control-PQIs to the UE by higher-layer signaling (e.g., RRC signaling). The UE may receive an EPDCCH based on the indicated specific control-PQI. The control-PQI may include the same/similar elements as/to those of the PQI for data reception. For example, the control-PQI may include the following elements.

Information about the number of CRS antenna ports.
Information about a CRS frequency shift.
Information about an MBSFN subframe configuration.
Information about a zero-power CSI-RS resource configuration.
Information about a PDSCH starting position.
Information about a CSI-RS resource configuration ID.

In embodiments of the present invention, a control-PQI for detection/reception of a control channel transmitted in each partial SS may be configured independently for the partial SS. Also, a QCL operation may be determined/applied in correspondence with a control channel transmitted in each partial SS, depending on a QCL configuration (e.g., QCL Type A or QCL Type B) corresponding to data scheduled in the partial SS.

For example, if a control channel corresponding to a partial SS is a legacy PDCCH, a control-PQI for PDCCH detection/reception (i.e., PDCCH transmission RE mapping) may be configured to include all or a specific part of the following PQI elements.

Information about the number of CRS antenna ports (refer to PQI element 1).
Information about a CRS frequency shift (refer to PQI element 2).
Information (e.g., PHICH-config) from which the position/period of PHICH transmission resources (e.g., REs) may be determined/inferred. For example, PHICH configuration information may include PHICH duration information and PHICH resource information (e.g., $N_g$ in Equation 2) for a normal CP and an extended CP.
Information (e.g., a CFI value) from which a PDCCH transmission resource period (e.g., a symbol period) may be determined/inferred. The CFI value may be equal to a PHICH duration.
Information about an MBSFN subframe configuration (refer to PQI element 3).
Information about a PDSCH starting position (refer to PQI element 5).

TM10-related parameters may be configured independently for each PQI of a PQI set configured in a single partial SS or each PQI subset (including one or more PQIs). For example, the TM10-related parameters that are configured independently may include the foregoing DMRS scrambling ID, (non-ZP and/or ZP) CSI-RS resources, CSI-IM resources, QCL (type) information, etc. In another method, if a whole PQI set is given without any particular partitioning of SSs, TM10-related parameters may be configured independently for each PQI of the PQI set or each PQI subset (including one or more PQIs). For example, the TM10-related parameters that are configured independently may include the foregoing DMRS scrambling ID, (non-ZP and/or ZP) CSI-RS resources, CSI-IM resources, QCL (type) information, etc.

If a QCL type (e.g., A or B) corresponding to data is configured independently (or differently) for each PQI (or PQI subset) of a PQI set configured in each partial SS or a PQI set given in an entire SS without partitioning as described above, a QCL operation to be determined/applied for a control channel associated with data may be preset or indicated by higher-layer signaling (e.g., RRC signaling), on the assumption of a QCL type (e.g., A or B) corresponding to the data for detection/reception of a control channel transmitted in the partial or entire SS.

Reference CRS information (e.g., a cell ID corresponding to CRSs, the number of antenna ports, and an MBSFN subframe configuration) related to a QCL operation corresponding to data/a control channel scheduled/transmitted in each partial SS, or information from which the CSR information may be inferred may be configured by higher-layer signaling (e.g., RRC signaling). Or reference CRS information corresponding to a serving cell that transmits a control channel in each partial SS, or information from which the reference CRS information may be inferred may be configured on a partial SS basis by higher-layer signaling (e.g., RRC signaling).

Meanwhile, interference cancellation and data reception performance may not be ensured or worsened just by applying only one PQI of the given type, depending on a cell deployment environment or the channel state of a UE when a TM10-based CoMP operation is performed according to the proposed method (the legacy method or any other method). This problem may be overcome by designing a new PQI type that may accurately reflect a channel state. However, the new PQI type may increase the signaling overhead of each PQI element configuration. Accordingly, it is proposed that one PQI is configured by combining a plurality of legacy-type PQIs. A legacy-type PQI may be referred to as a basis-PQI and a combined PQI may be referred to as a comb-PQI. Different PQI elements (i.e., different basis-PQI elements) may be configured for a plurality of legacy basis-PQIs that form one comb-PQI. Then, the PQI elements (i.e., comb-PQI elements) of a final comb-PQI may be determined as follows (i.e., by preparing for a worst case).

The number of CRS antenna ports/a CRS frequency shift.
A specific combination of CRS patterns corresponding to the respective basis-PQIs is applied as final CRS information. For example, the union or intersection of the CRS patterns corresponding to the respective basis-PQIs may be applied to the comb-PQI.
An MBSFN subframe configuration.
A specific combination of MBSFN subframe patterns corresponding to the respective basis-PQIs is applied as final MBSFN subframe information. For example, the union or intersection of the MBSFN subframe patterns corresponding to the respective basis-PQIs may be applied to the comb-PQI.
A ZP CSI-RS resource configuration.
A specific combination of ZP CSI-RS resource patterns corresponding to the respective basis-PQIs is applied as final ZP CSI-RS resource information. For example, the union or intersection of the ZP CSI-RS resource patterns corresponding to the respective basis-PQIs may be applied to the comb-PQI.
A PDSCH starting position.
A specific value out of PDSCH starting position values corresponding to the respective basis-PQIs is applied as a final PDSCH starting position. For example, a maximum or minimum value of the PDSCH starting position values corresponding to the respective basis-PQIs may be applied to the comb-PQI.
A CSI-RS resource configuration ID.
A specific combination of CSI-RS resource patterns corresponding to the respective basis-PQIs is applied as final CSI-RS resource information. For example, the union or intersection of the CSI-RS resource patterns corresponding to the respective basis-PQIs may be applied to the comb-PQI.

In another method, (compared to a legacy CQI configuration method in which one parameter is configured on a PQI element basis), one PQI may be configured by configuring one or more parameters per PQI element. For example, N parameter combinations (of number of CRS antenna ports and CRS frequency shift) may be configured for PQI elements 1 and 2. In this case, a specific combination (e.g., the union or intersection) of CRS patterns corresponding to each parameter may be applied as final CRS information, similarly to the foregoing method. In another example, M MBSFN subframe configuration parameters may be configured for PQI element 3. Similarly, a specific combination of MBSFN subframe patterns corresponding to the respective parameters may be applied as final MBSFN subframe information. In another example, K1 ZP CSI-RS resource configurations and K2 CSI-RS resource configuration IDs may be configured for each of PQI elements 4 and 6. Similarly, a specific combination of CSI-RS resource patterns corresponding to the respective parameters may be applied as final CSI-RS resource information.

Meanwhile, partial SSs may overlap with each other during implementation of the proposed method. In this case, ambiguity may arise in determining a partial SS carrying a DL grant detected from a specific (E)PDCCH candidate or specific (E)CCE in the overlap area (transmitted in a specific DCI format configured to have the same payload size in the partial SSs). That is, ambiguity may exist in interpretation of a partial SS in which a PQI set is configured to have a PQI indicated by a PQI field of a DL grant. In this case, the DL grant may be regarded as transmitted in a specific partial SS and the partial SS may be preset or indicated by higher layer signaling (e.g., RRC signaling). That is, a PQI field included in a DL grant detected in an overlap area may be preset or may be regarded as determined within a PQI set corresponding to a specific partial SS indicated by higher-layer signaling. For example, the specific partial SS may be configured as a partial SS having the lowest or highest index (as an index identifying a partial SS). More specifically, if EPDCCH set 1 and EPDCCH set 2 are used as partial SSs and the lowest index is used, EPDCCH set 1 may be the specific partial SS. Or in another method, if partial SSs overlap with each other, a UE may not attempt to detect/receive an (E)PDCCH candidate in the overlap area.

When a TM10-based CoMP operation is performed in the proposed method (the legacy method or any other method), data scheduled in a TM-common DCI format (e.g., DCI format 1A) transmitted in a USS may be received by configuring/applying a specific PQI (indicated in a PQI set configured in a (partial) SS from which DCI is detected/received) (and/or a specific TM10-related parameter configured in the (partial) SS), and data scheduling in a TM-common DCI format transmitted in a CSS may be received by applying only an RS structure (e.g., a CSR pattern and/or a CSI-RS resource configuration) configured in a (serving) cell that has transmitted data or DCI, without configuring/applying a separate PQI (and/or a TM10-related parameter).

In another method, data scheduled in a TM-common DCI format to which C-RNTI-based or SPS C-RNTI-based (CRC) scrambling is applied may be received by configuring/applying a specific PQI (indicated in a PQI set configured in a (partial) SS in which DCI is detected/received) (and/or a specific TM10-related parameter configured in the (partial) SS), and data scheduled in a TM-common DCI format to which P-RNTI-based, RA RNTI-based, SI-RNTI-based, or temporary C-RNTI-based scrambling is applied may be received only by applying an RS structure (e.g., a CRS pattern and/or a CSI-RS resource configuration) and/or a subframe configuration (e.g., an MBSFN configuration and/or a PDSCH starting symbol) configured in a (serving) cell that has transmitted data or DCI, without separately configuring/applying a PQI.

Even in this case, the CSS and the USS may overlap with each other. Likewise, it may be assumed that a TM-common DCI format (configured to have the same payload size in the CSS and the USS) detected from an overlap area has been transmitted in a specific SS (e.g., the CSS or the USS) (preset or configured by higher-layer signaling (e.g., RRC signaling). Accordingly, if the specific SS preset or configured by higher-layer signaling is the USS, a UE may receive data corresponding to corresponding DCI by configuring/applying a specific PQI (and/or a specific TM10-related parameter). If the specific SS preset or configured by higher-layer signaling is the CSS, the UE may receive the data corresponding to the corresponding DCI without separately configuring/applying a specific PQI (and/or a specific TM10-related parameter). In another method, if the CSS and the USS overlap with each other, the UE may not attempt to detect/receive an (E)PDCCH in the overlap area.

Further, a method for configuring a TM independently for each partial SS may be configured. For example, CoMP-based TM10 may be configured for partial SS 1 and a non-CoMP-based TM (e.g., TM9) may be configured for partial SS 2. In this case, if the UE is scheduled from partial SS 1, the UE may receive data corresponding to a corresponding DL grant by applying a specific PQI corresponding to a value indicated by the PQI field of the DL grant in TM10, whereas if the UE is scheduled from partial SS 2, the UE may perform a general data reception operation (based on UE-specific DMRSs) in TM9 without applying a PQI. Or in another example, (different) non-CoMP-based TMs (e.g., TM9+TM8) may be configured for partial SS 1 and partial SS 2.

In an inter-site CoMP situation, the above TM configuration method (in which different TMs are applied to different SSs) may be considered. In this case, even though the UE is scheduled from partial SS 1 (allocated to eNB1) for which a non-CoMP-based TM is configured, eNB2 may manage the mobility of the UE and may be responsible for Radio Resource Management (RRM) of the UE, and/or may establish an RRC connection with the UE (or the UE may consider eNB2 to be a cell accessed by the UE) and partial SS 2 may be allocated to eNB2. For this situation, it is proposed that a specific (one) PQI or all or part (including a PQI) of TM10-related parameters including the foregoing DMRS scrambling ID information, (non-ZP and/or ZP) CSI-RS resource information, CSI-IM resource information, and QCL (type) information may be configured for a specific partial SS set to a non-CoMP-based RM. Therefore, when the UE is scheduled from a non-CoMP TM-configured partial SS, the UE may receive data by applying a specific PQI configured for the partial SS. In another method, when the UE receives data corresponding to a DL grant through the DL grant transmitted in a specific non-CoMP TM-configured partial SS, the UE may be notified whether a specific PQI (configured for the partial SS) is to be applied. For example, whether the specific PQI is to be applied may be indicated by a 1-bit field of the DL grant and the 1-bit field may indicate PQI ON/OFF for the non-CoMP TM-configured partial SS (or for data reception corresponding to it). This method may be useful when a partial SS is allocated on a subframe group basis.

The foregoing proposed method may also be applied when partial SSs overlap with each other. For example, it may be assumed that a DL grant (configured to have the same payload size in the partial SSs and transmitted in a specific DCI format) detected from an overlap area has been transmitted in a specific partial SS. Specifically, the specific partial SS may be preset (e.g., a partial SS having the lowest or highest index) or may be configured by higher-layer signaling (e.g., RRC signaling). Therefore, the UE may receive data corresponding to the DL grant by applying a PQI configured in the preset SS (in the case where the corresponding SS is configured for a non-CoMP-based TM (e.g., TM9)) or in the specific SS indicated by higher-layer signaling or by applying one of a PQI set (in the case where the SS is configured for a CoMP TM (e.g., TMN10)). Or in another method, if an overlap occurs between partial SSs, the UE may not attempt to detect/receive an (E)PDCCH candidate in the overlap area.

Meanwhile, compared to the legacy carrier type configured/designed to transmit CRSs successively in every DL subframe, the new carrier type may be configured/designed so that common RSs (i.e., tracking RSs or TRSs) for tracking time/frequency synchronization, other than the CRSs, are transmitted intermittently/periodically. In this case, the CRSs may be replaced with the TRSs in the present invention.

Figure 21:
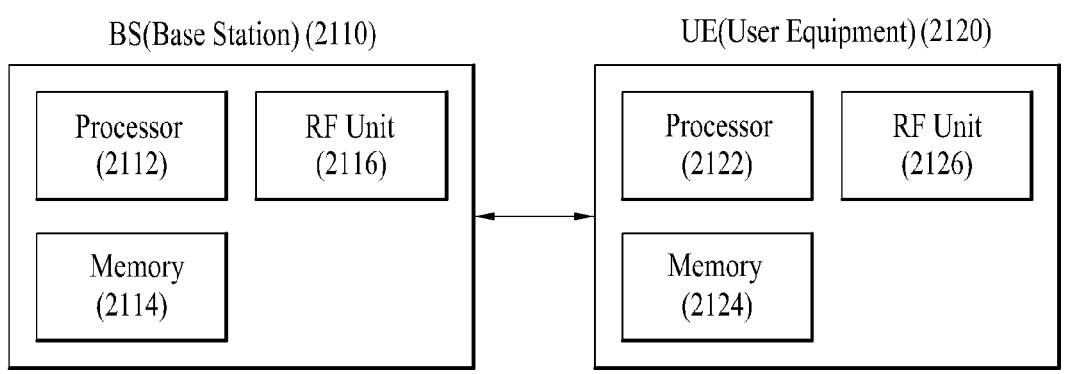
FIG. 21 is a diagram illustrating a base station and a user equipment to which the present invention is applicable.

FIG. 21 is a diagram illustrating a base station and a user equipment to which the present invention is applicable.

Referring to FIG. 21, a wireless communication system includes the BS 1510 and the UE 1520. When the wireless communication system includes a relay, the BS 1510 or the UE 1520 may be replaced with the relay.

The BS 2110 includes a processor 2112, a memory 2114, and a radio frequency (RF) unit 2116. The processor 2112 may be configured to embody the procedures and/or methods proposed by the present invention. The memory 2114 is connected to the processor 2112 and stores various pieces of information associated with an operation of the processor 2112. The RF unit 2116 is connected to the processor 2112 and transmits/receives a radio signal. The UE 2120 includes a process 2122, a memory 2124, and an RF unit 2126. The processor 2122 may be configured to embody the procedures and/or methods proposed by the present invention. The memory 2124 is connected to the processor 2122 and stores various pieces of information associated with an operation of the processor 2122. The RF unit 2126 is connected to the processor 2122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for transmitting an uplink signal to a plurality of transmission points by a User Equipment (UE) in a wireless communication system, the method comprising:
receiving information about at least one parameter set group via higher-layer signaling, each of the at least one parameter set group including a plurality of parameter sets;
detecting a Physical Downlink Control Channel (PDCCH) including indication information indicating a specific parameter set belonging to one parameter set group of the at least one parameter set group; and
transmitting a Physical Uplink Shared Channel (PUSCH) signal using the specific parameter set,
wherein each of the plurality of parameter sets includes information about Timing Advance (TA) and information about power control parameter for transmission of the PUSCH signal, and
wherein each of the plurality of parameter sets further includes information for reception of a Physical Hybrid automatic repeat and request indicator Channel (PHICH) signal corresponding to transmission of the PUSCH signal, and the information for reception of the PHICH signal includes at least one of information about the number of Cell-specific Reference Signal (CRS) antenna ports, information about a CRS frequency shift, PHICH configuration information, and PHICH resource index information.

2. The method according to claim 1,
wherein the information about power control parameter includes open-loop power control parameter information for transmission of the PUSCH signal or mapping information between a Transmit Power Control (TPC) command included in the PDCCH and a value indicated by the TPC command, and wherein each of the plurality of parameter sets includes at least one of information about a cell Identity (ID) for generating UE-specific Demodulation Reference Signal (DMRS) for transmission of the PUSCH signal, information about a Sounding Reference Signal (SRS) transmission subframe, and information about an SRS transmission band.

3. The method according to claim 1, wherein the PDCCH includes a TPC command, and a value indicated by the TPC command is accumulated only for a same parameter set.

4. The method according to claim 1, wherein if the PDCCH includes downlink control information common to a plurality of UEs and the downlink control information includes a TPC command, a value indicated by the TPC command is accumulated for all parameter sets.

5. The method according to claim 1,
wherein if the PDCCH includes downlink control information common to a plurality of UEs and the downlink control information includes a TPC command, a value indicated by the TPC command is accumulated for a predetermined parameter set, and
wherein the predetermined parameter set is a parameter set having a lowest index, a parameter set having a highest index, or a parameter set determined by higher-layer signaling.

6. The method according to claim 1,
wherein each of the at least one parameter set group is configured independently per search space for detection of the PDCCH, and
wherein the one parameter set group is determined according to a search space in which the PDCCH is detected.

7. The method according to claim 1,
wherein a search space for detection of the PDCCH includes a PDCCH candidate group, and
wherein the one parameter set group is determined according to a PDCCH candidate group in which the PDCCH is detected.

8. The method according to claim 1,
wherein a search space for detection of the PDCCH includes a specific subframe group, and
wherein the one parameter set group is determined according to a subframe in which the PDCCH is detected.

9. The method according to claim 1,
wherein a search space for detection of the PDCCH is a UE-specific search space or a cell-specific search space, and
wherein the one parameter set group is determined according to whether the PDCCH is detected in the UE-specific search space or the cell-specific search space.

10. The method according to claim 1, wherein if respective PDCCHs are detected in a plurality of search spaces and the search spaces are overlapped at least partially, the PDCCH corresponds to a PDCCH detected in a search space indicated by higher-layer signaling is used.

11. The method according to claim 1,
wherein if a plurality of PDCCHs are detected in respective search spaces and the search spaces are overlapped at least partially, the PDCCH corresponds to a PDCCH detected in a search space having a lowest index or a highest index.

12. A User Equipment (UE) for transmitting an uplink signal to a plurality of transmission points in a wireless communication system, the UE comprising:
a Radio Frequency (RF) unit; and
a processor, wherein the processor is configured to:
receive information about at least one parameter set group via higher-layer signaling through the RF unit, each of the at least one parameter set group including a plurality of parameter sets,
detect a Physical Downlink Control Channel (PDCCH) including indication information indicating a specific parameter set in one parameter set group of the at least one parameter set group, and
transmit a Physical Uplink Shared Channel (PUSCH) signal using the specific parameter set, and
wherein each of the plurality of parameter sets includes information about Timing Advance (TA) and information about power control parameter for transmission of the PUSCH signal, and
wherein each of the plurality of parameter sets further includes information for reception of a Physical Hybrid automatic repeat and request indicator Channel (PHICH) signal corresponding to transmission of the PUSCH signal, and the information for reception of the PHICH signal includes at least one of information about the number of Cell-specific Reference Signal (CRS) antenna ports, information about a CRS frequency shift, PHICH configuration information, and PHICH resource index information.

13. The UE according to claim 12,
wherein the information about power control parameter includes open-loop power control parameter information for transmission of the PUSCH signal or mapping information between a Transmit Power Control (TPC) command included in the PDCCH and a value indicated by the TPC command, and
wherein each of the plurality of parameter sets includes at least one of information about a cell Identity (ID) for generating UE-specific Demodulation Reference Signal (DMRS) for transmission of the PUSCH signal, information about a Sounding Reference Signal (SRS) transmission subframe, and information about an SRS transmission band.

14. The UE according to claim 12, wherein the PDCCH includes a TPC command, and a value indicated by the TPC command is accumulated only for a same parameter set.

15. The UE according to claim 12, wherein if the PDCCH includes downlink control information common to a plurality of UEs and the downlink control information includes a TPC command, a value indicated by the TPC command is accumulated for all parameter sets.

16. The UE according to claim 12,
wherein if the PDCCH includes downlink control information common to a plurality of UEs and the downlink control information includes a TPC command, a value indicated by the TPC command is accumulated for a predetermined parameter set, and
wherein the predetermined parameter set is a parameter set having a lowest index, a parameter set having a highest index, or a parameter set determined by higher-layer signaling.

17. The UE according to claim 12,
wherein each of the at least one parameter set group is configured independently per search space for detection of the PDCCH, and wherein the one parameter set group is determined according to a search space in which the PDCCH is detected.

18. The UE according to claim 12,
wherein a search space for detection of the PDCCH includes a PDCCH candidate group, and
wherein the one parameter set group is determined according to a PDCCH candidate group in which the PDCCH is detected.

19. The UE according to claim 12,
wherein a search space for detection of the PDCCH includes a specific subframe group, and
wherein the one parameter set group is determined according to a subframe in which the PDCCH is detected.

20. The UE according to claim 12,
wherein a search space for detection of the PDCCH is a UE-specific search space or a cell-specific search space, and
wherein the one parameter set group is determined according to whether the PDCCH is detected in the UE-specific search space or the cell-specific search space.

* * * * *